US009692597B2

(12) United States Patent
Hesketh et al.

(10) Patent No.: US 9,692,597 B2
(45) Date of Patent: Jun. 27, 2017

(54) APPARATUS AND METHOD FOR CONTENT HANDLING

(71) Applicant: Gould Tech Solutions Limited, Leeds (GB)

(72) Inventors: Adrian Hesketh, Leeds (GB); Arthur Christian Sloan, Leeds (GB); Jason Robert Wilkinson, Leeds (GB); Joshua Gould, Leeds (GB)

(73) Assignee: Gould Tech Solutions Limited, Leeds (GB)

( * ) Notice: Subject to any disclaimer, the term of this patent is extended or adjusted under 35 U.S.C. 154(b) by 0 days.

(21) Appl. No.: 14/564,163

(22) Filed: Dec. 9, 2014

(65) Prior Publication Data
US 2015/0269358 A1 Sep. 24, 2015

(30) Foreign Application Priority Data

Mar. 20, 2014 (GB) .................................. 1405025.6

(51) Int. Cl.
*H04L 29/06* (2006.01)
*H04L 9/08* (2006.01)
(Continued)

(52) U.S. Cl.
CPC ...... *H04L 9/0866* (2013.01); *G06F 17/30864* (2013.01); *G06F 21/6209* (2013.01);
(Continued)

(58) Field of Classification Search
CPC .............. G06F 21/10; G06F 17/30864; G06F 21/6209; G06F 2221/07; H04L 63/12;
(Continued)

(56) References Cited

U.S. PATENT DOCUMENTS 6,393,568 B1 * 5/2002 Ranger ................. G06F 21/562
713/188
6,602,469 B1 8/2003 Maus et al.
(Continued)

FOREIGN PATENT DOCUMENTS

EP 1582997 A2 10/2005
WO 2008114104 A1 9/2008

OTHER PUBLICATIONS

Hwang, Seong Oun. "Content and service protection for IPTV." IEEE Transactions on Broadcasting 55.2 (2009): 425-436.*
(Continued)

*Primary Examiner* — Chau Le
*Assistant Examiner* — Muhammad Chaudhry
(74) *Attorney, Agent, or Firm* — Hoffman Warnick LLC

(57) ABSTRACT

An apparatus for content handling is provided. The apparatus comprises a content server arranged to provide a content analysis environment to a client terminal, and to provide content to the client terminal for analysis within the content analysis environment once the content analysis environment has been established at the client terminal, wherein the client terminal is arranged: to download the content from the content server into the content analysis environment; to encrypt the downloaded content and store the encrypted content therein in a persistent form; to decrypt the encrypted content into working memory therein for analysis within content analysis environment; to encrypt analyzed content and store the encrypted analyzed content therein in a persistent form; and to decrypt the encrypted analyzed content and to upload this decrypted content to the content server.

17 Claims, 23 Drawing Sheets

(51) Int. Cl.
*G06F 17/30* (2006.01)
*G06F 21/62* (2013.01)

(52) U.S. Cl.
CPC .......... H04L 63/0428 (2013.01); H04L 63/10 (2013.01); H04L 63/12 (2013.01); *G06F 2221/07* (2013.01)

(58) Field of Classification Search
CPC ... H04L 29/06; H04L 9/0866; H04L 63/0428; H04L 63/10
See application file for complete search history.

(56) References Cited

U.S. PATENT DOCUMENTS

| | | | | |
|---|---|---|---|---|
| 8,341,409 | B2* | 12/2012 | Itani | G06F 21/10 380/201 |
| 9,141,820 | B2* | 9/2015 | Jalili | G06F 21/6209 |
| 9,143,530 | B2* | 9/2015 | Qureshi | H04L 63/20 |
| 9,253,060 | B2* | 2/2016 | Kester | G06F 11/3476 |
| 9,350,735 | B1* | 5/2016 | Parmar | H04L 63/10 |
| 2005/0039034 | A1* | 2/2005 | Doyle | H04L 9/0825 713/193 |
| 2005/0216313 | A1 | 9/2005 | Claud et al. | |
| 2005/0262573 | A1 | 11/2005 | Bo et al. | |
| 2007/0209005 | A1* | 9/2007 | Shaver | G06F 17/3089 715/733 |
| 2007/0239994 | A1* | 10/2007 | Kulkarni | G06F 21/602 713/189 |
| 2008/0021834 | A1 | 1/2008 | Holla et al. | |
| 2009/0151007 | A1* | 6/2009 | Koster | G06F 21/6245 726/30 |
| 2009/0217344 | A1* | 8/2009 | Bellwood | G06F 21/10 726/1 |
| 2010/0262545 | A1 | 10/2010 | Herlitz | |
| 2011/0043652 | A1* | 2/2011 | King | G06F 17/2211 348/222.1 |
| 2011/0154456 | A1 | 6/2011 | Machani | |
| 2011/0247075 | A1* | 10/2011 | Mykland | G06F 21/10 726/26 |
| 2012/0017087 | A1* | 1/2012 | Coppola | H04L 63/0428 713/171 |
| 2012/0124642 | A1* | 5/2012 | Lee | H04L 63/0428 726/1 |
| 2012/0233036 | A1* | 9/2012 | Mirashrafi | G06Q 30/00 705/27.2 |
| 2012/0254857 | A1* | 10/2012 | Doraiswamy | G06F 8/61 717/177 |
| 2013/0013931 | A1* | 1/2013 | O'Hare | G06F 21/62 713/189 |
| 2014/0047560 | A1* | 2/2014 | Meyer | G06F 21/62 726/28 |
| 2014/0053283 | A1* | 2/2014 | Odom | G06F 21/10 726/30 |
| 2015/0046184 | A1* | 2/2015 | Cocco | G06F 19/321 705/3 |

OTHER PUBLICATIONS

D'Angelo, Gabriele, Fabio Vitali, and Stefano Zacchiroli. "Content cloaking: preserving privacy with Google Docs and other web applications." Proceedings of the 2010 ACM symposium on applied computing. ACM, 2010.*

Yeh, Sheng-Cheng, et al. "A study on the data privacy and operation performance for cloud collaborative editing systems." Cloud Computing Technology and Science (CloudCom), 2012 IEEE 4th International Conference on. IEEE, 2012.*

Lee, Jung-Soo, and Ki-Song Yoon. "The system integration of DRM and fingerprinting." 2006 8th International Conference Advanced Communication Technology. vol. 3. IEEE, 2006.*

Extended European Search Report for European Application No. EP15160131, mailed Jul. 27, 2015, 6 pages.

European Examination Report for corresponding European Patent Application No. 15 160 131.7-1870, dated Jan. 19, 2017, 4 pages.

* cited by examiner

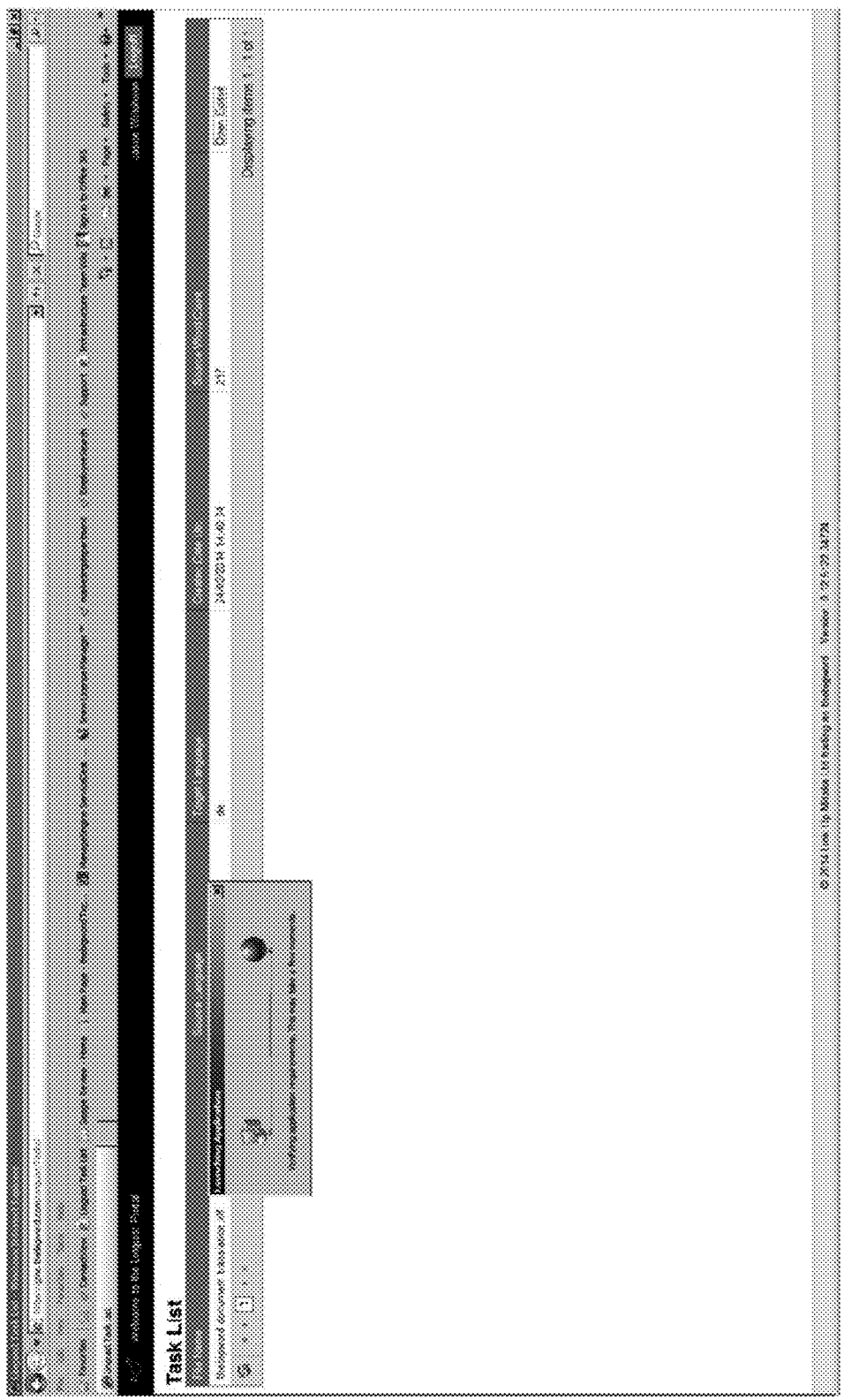
FIG. 3 (S101)

*FIG. 4* (S104, S105)

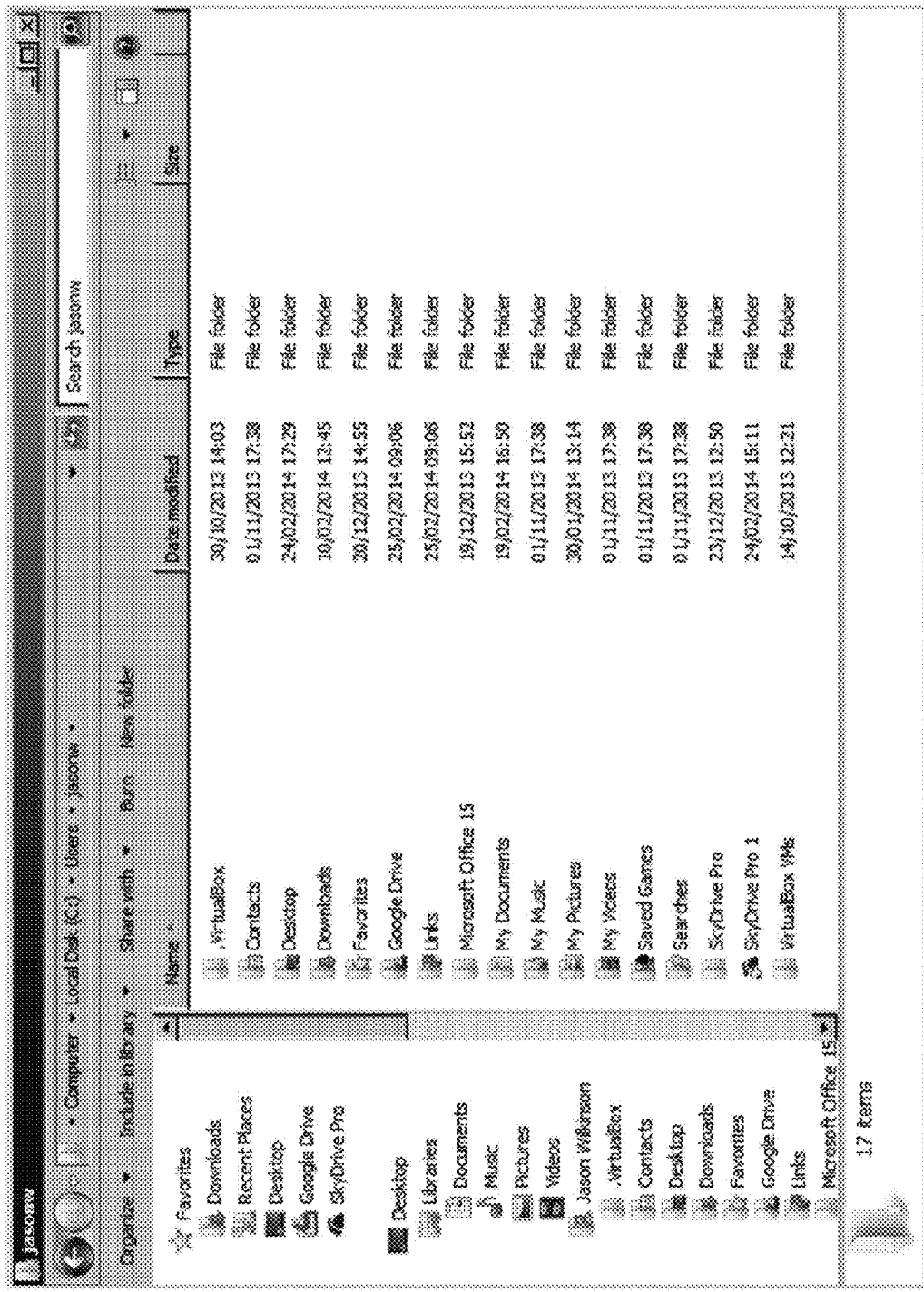
FIG. 5 (S106-S108)

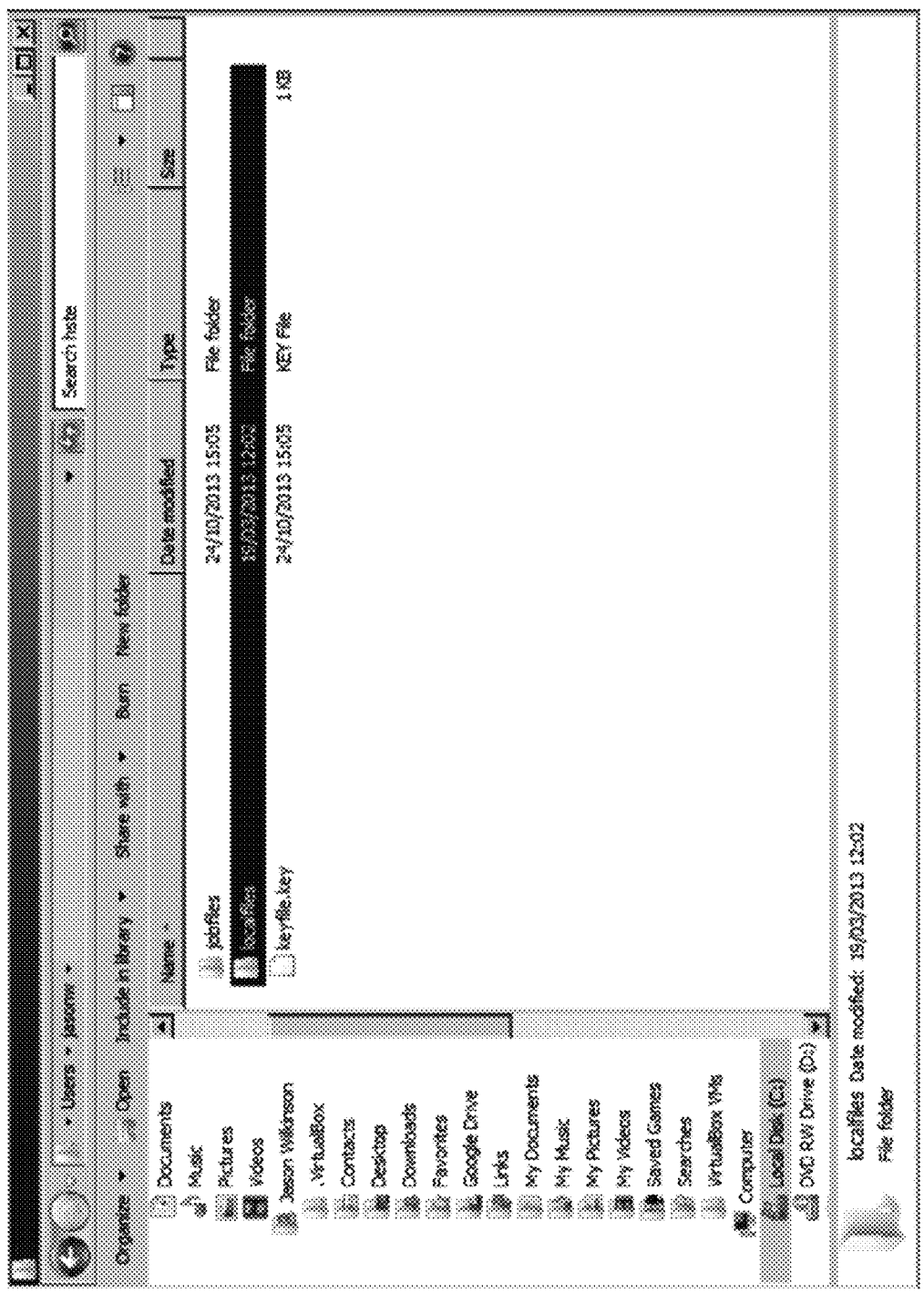
FIG. 6 (S106-S108)

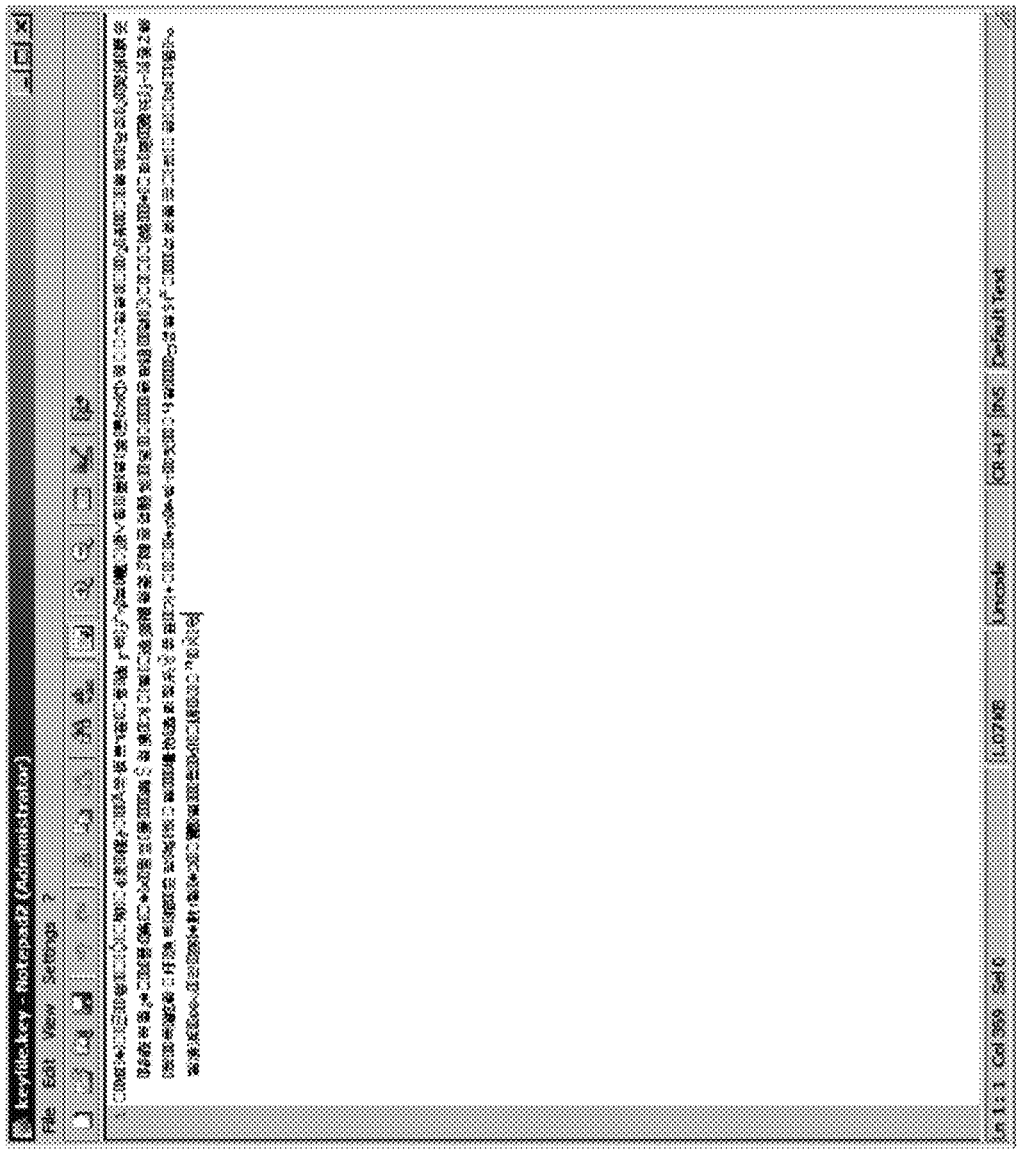
FIG. 7 (S102-S108)

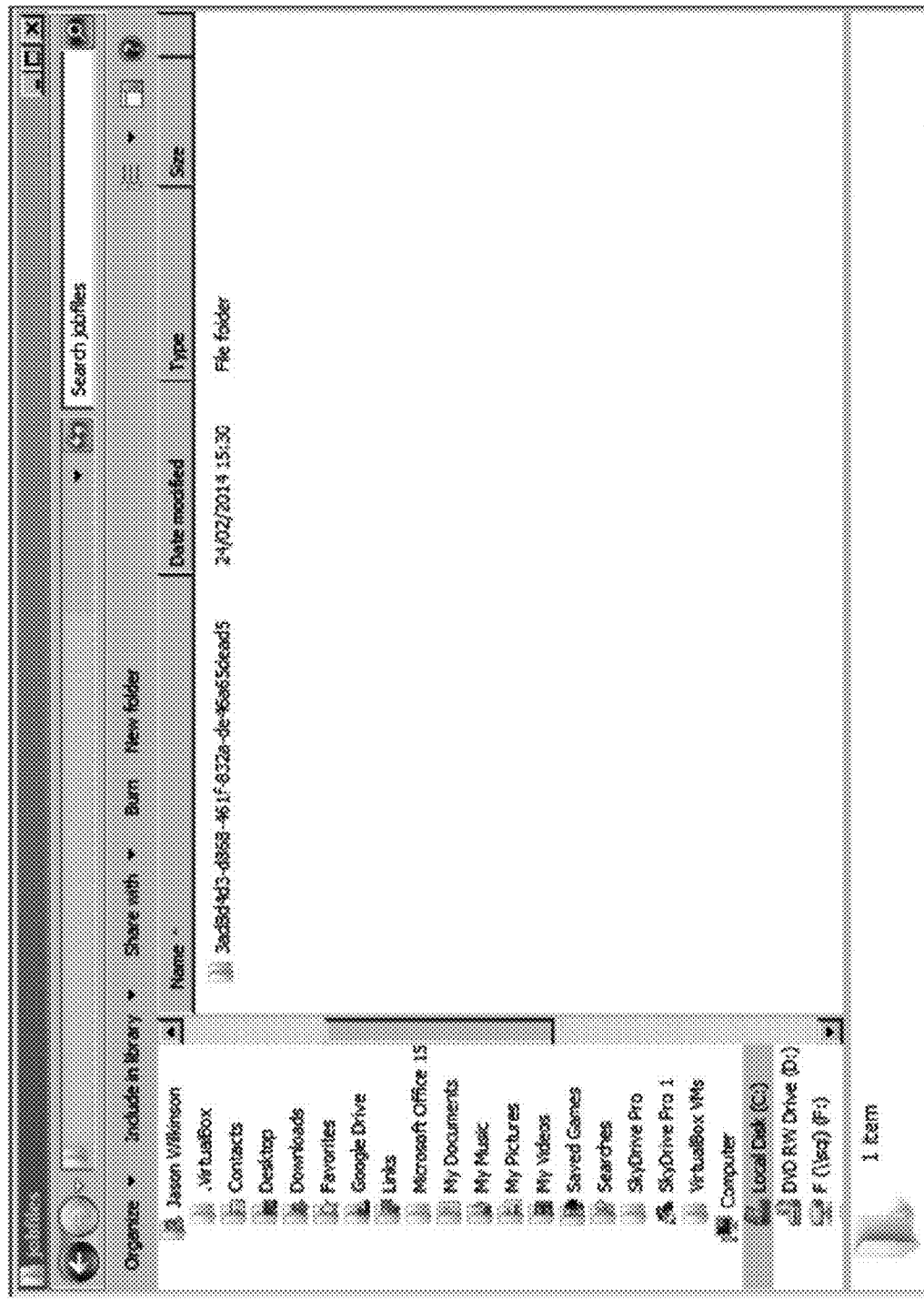
FIG. 8 (S106-S108)

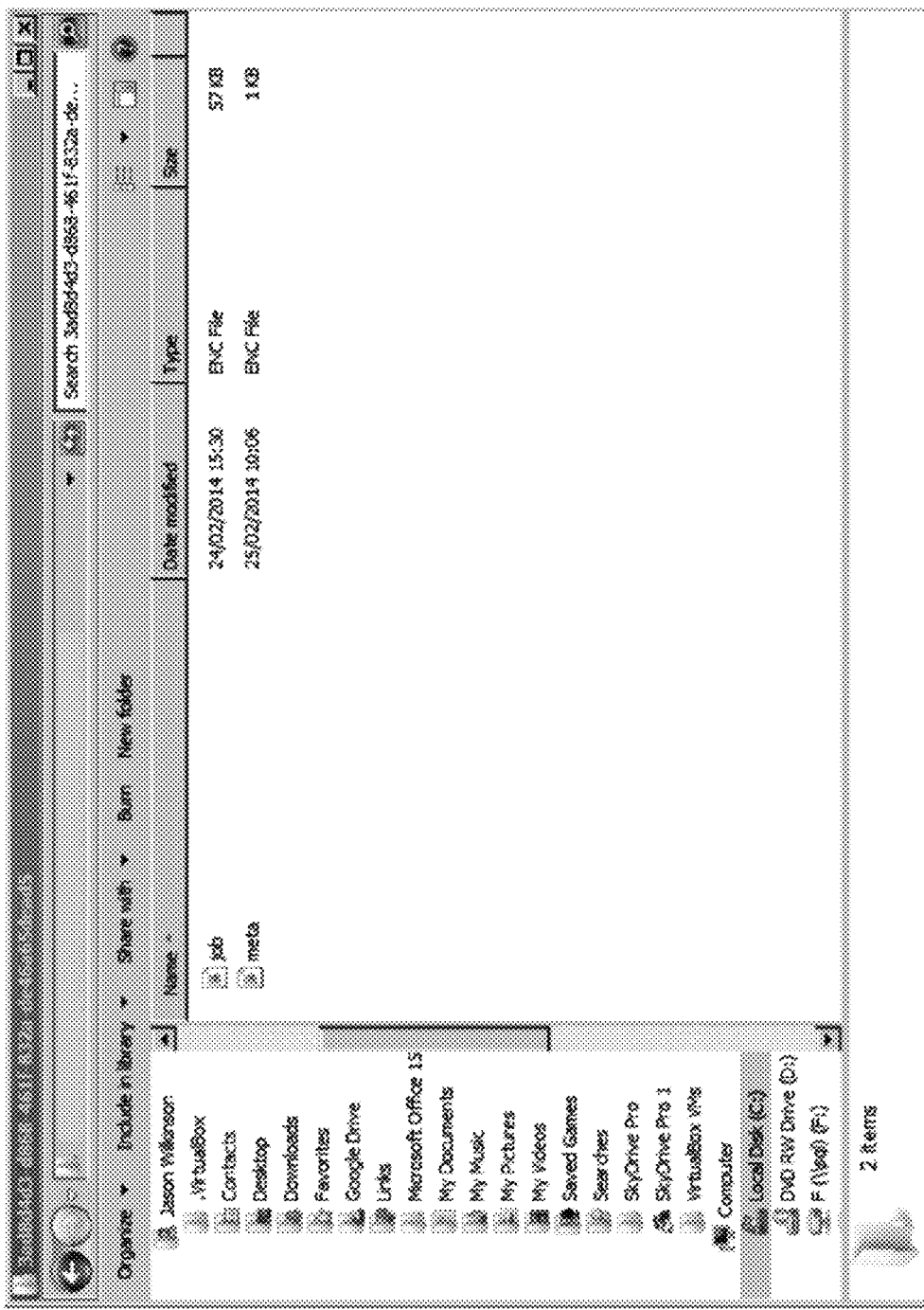
FIG. 9 (S106-S108)

FIG. 10 (S106-S108)

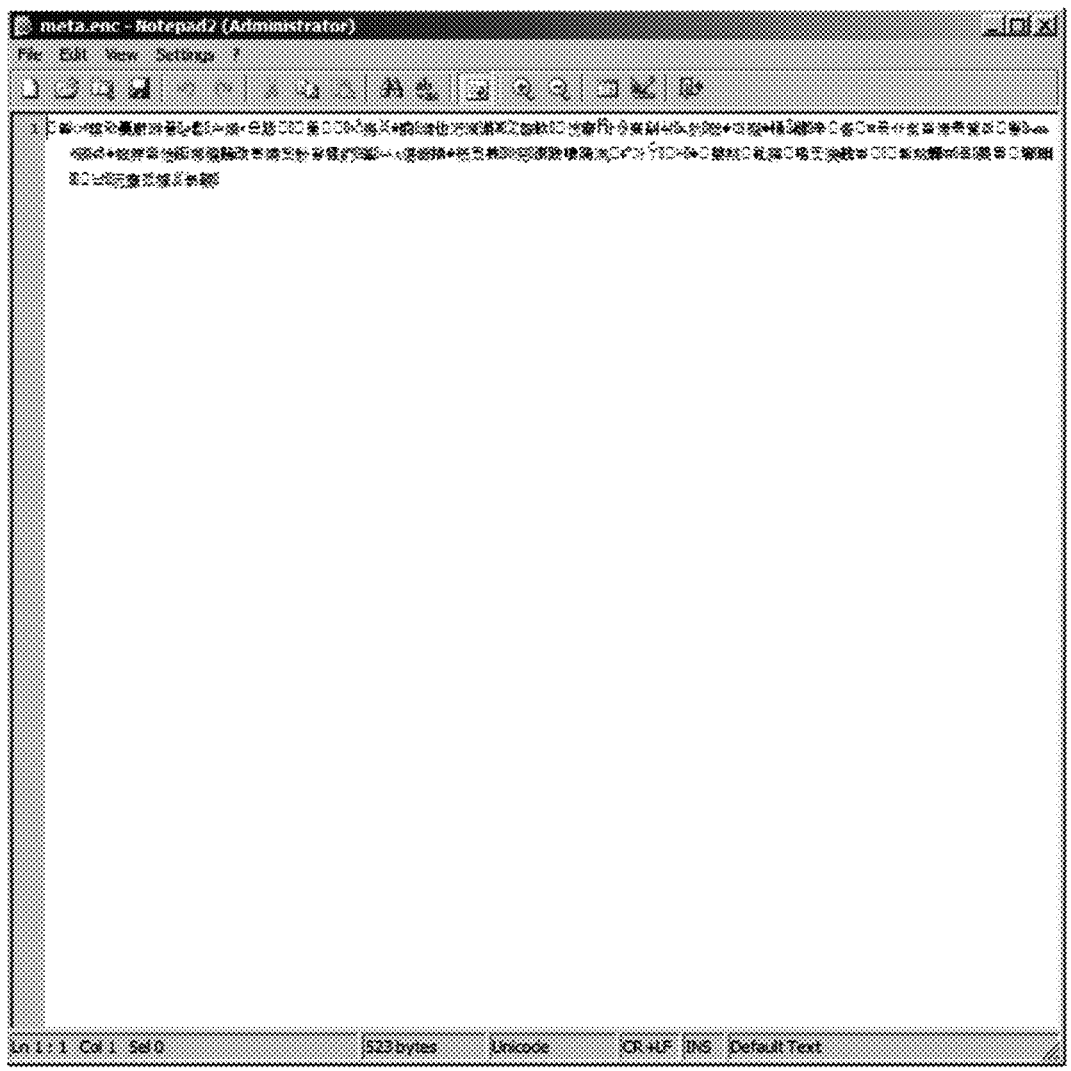
FIG. 11 (S106-S108)

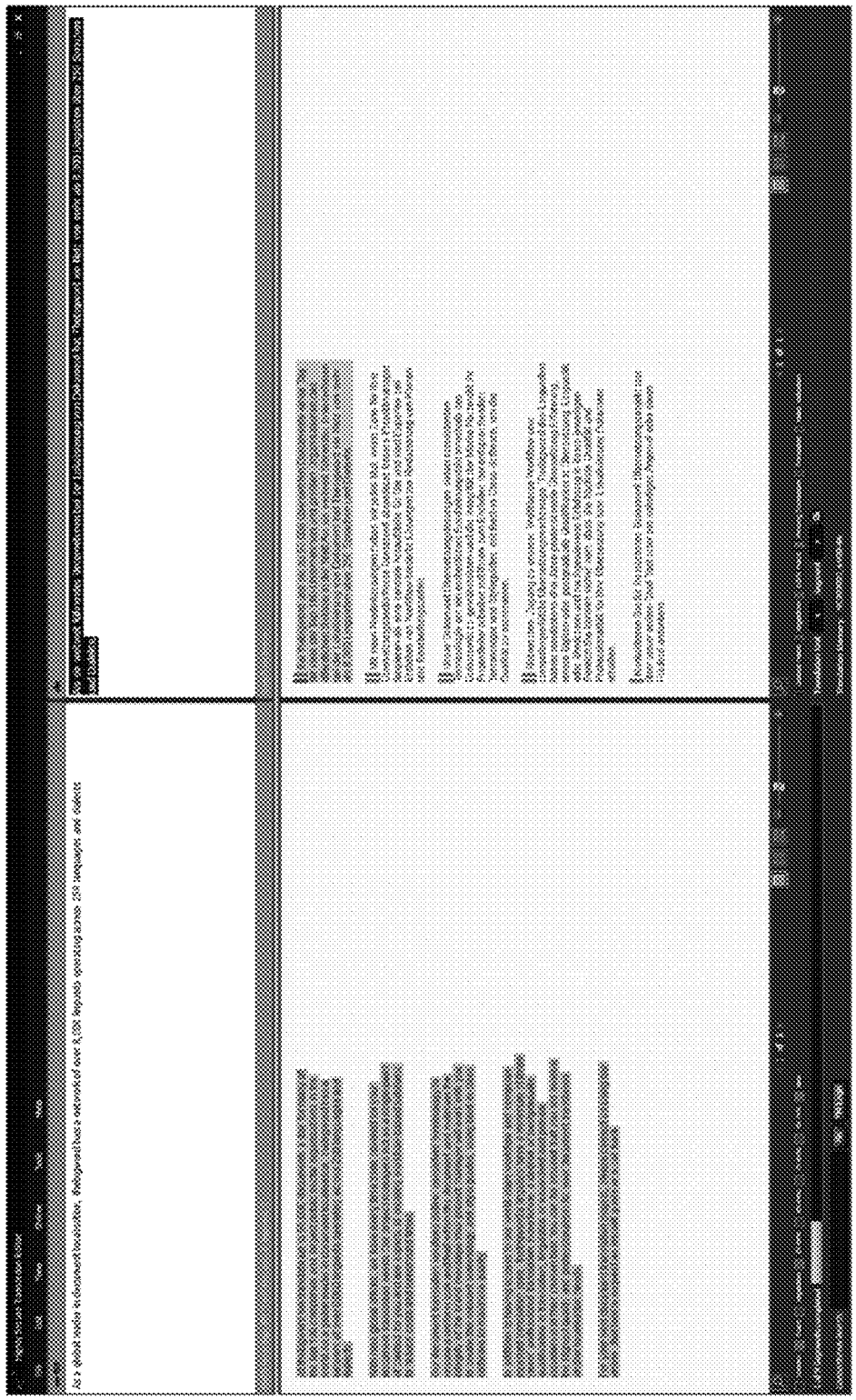
FIG. 12 (S107)

(S107-S111)

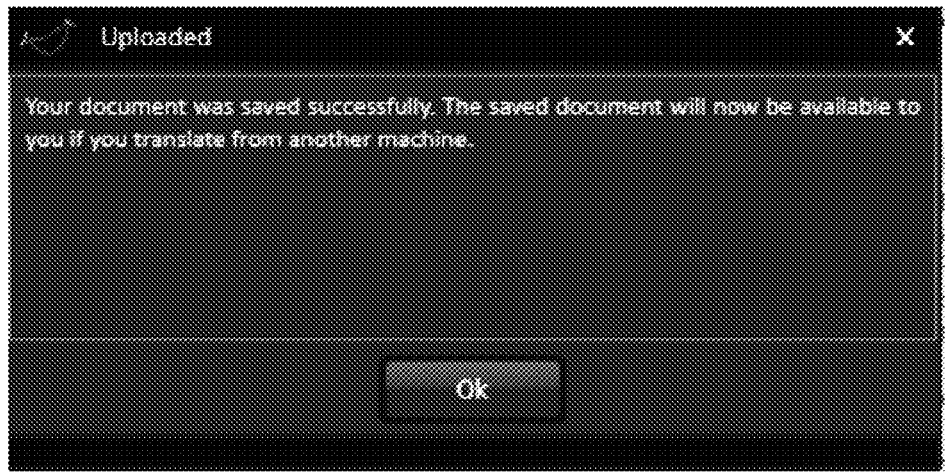
*FIG. 14* (S108-S109)

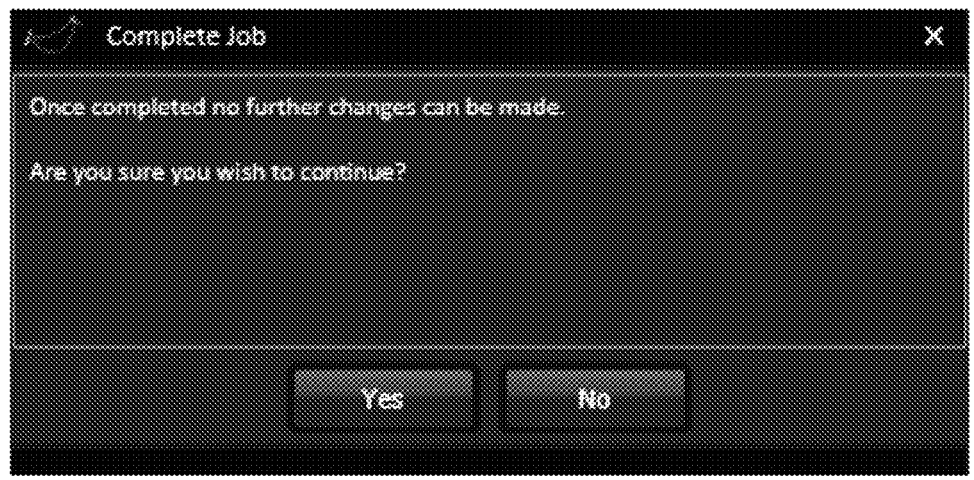
FIG. 15 (S115)

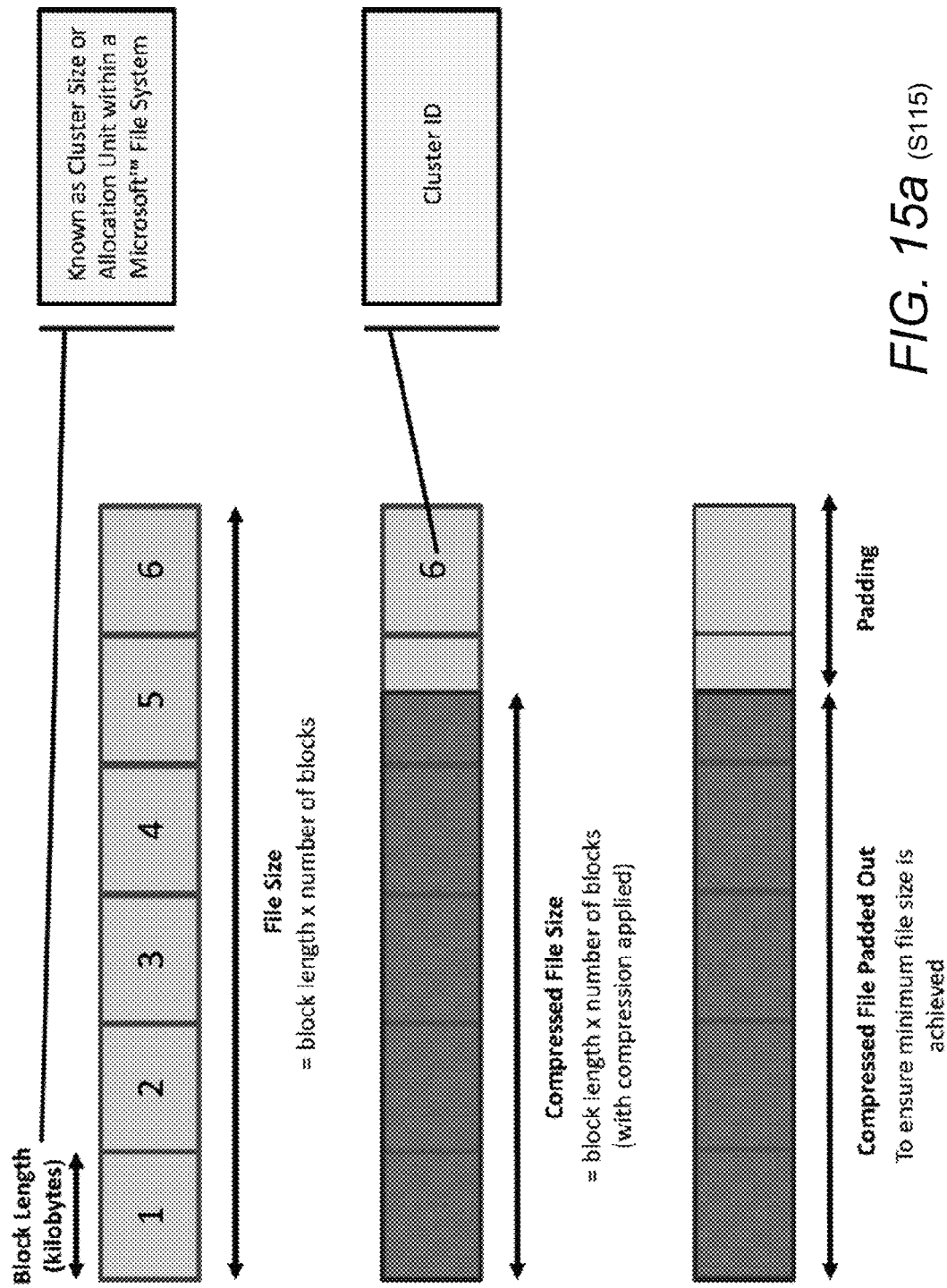
FIG. 15a (S115)

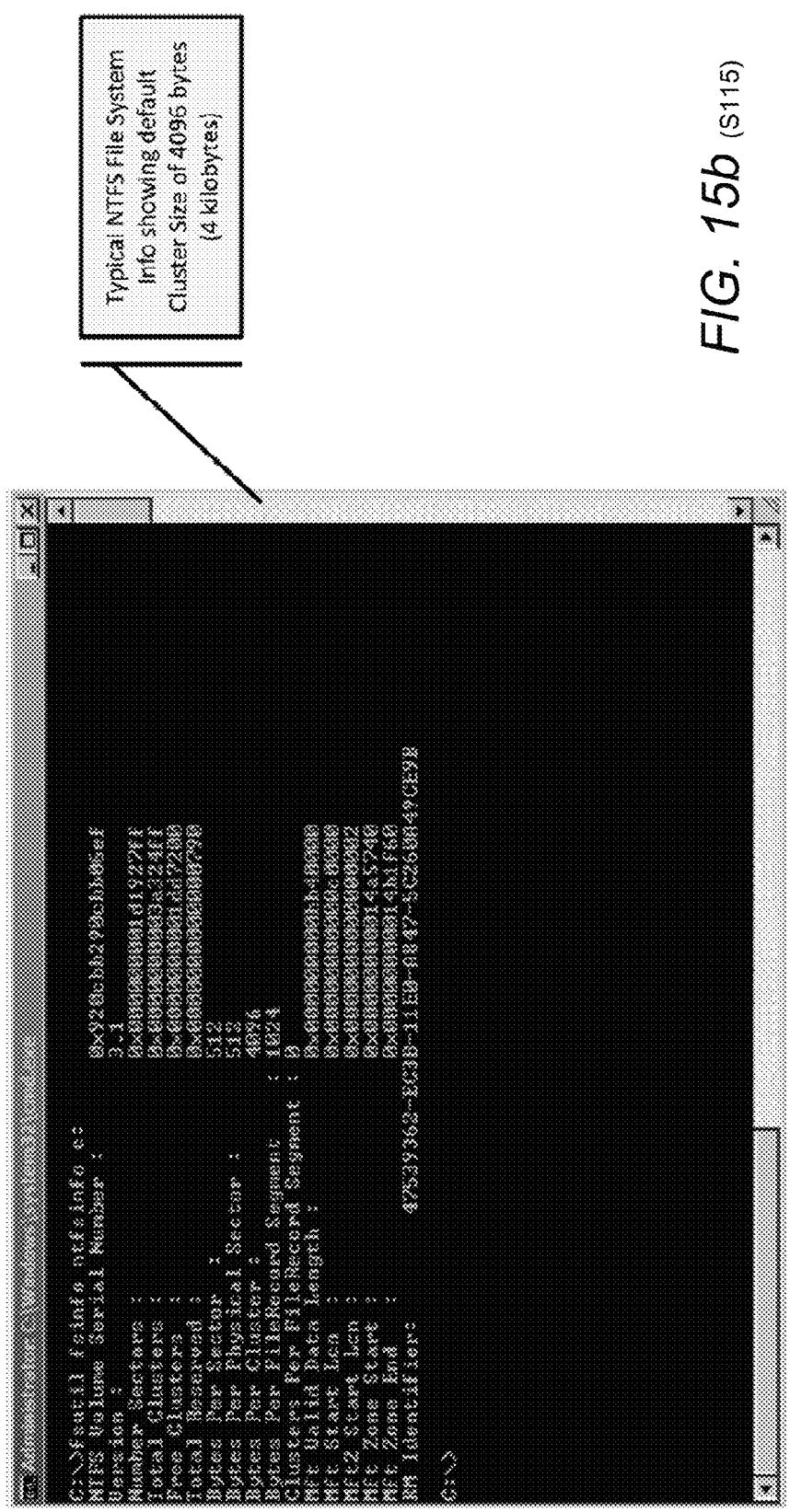
FIG. 15b (S115)

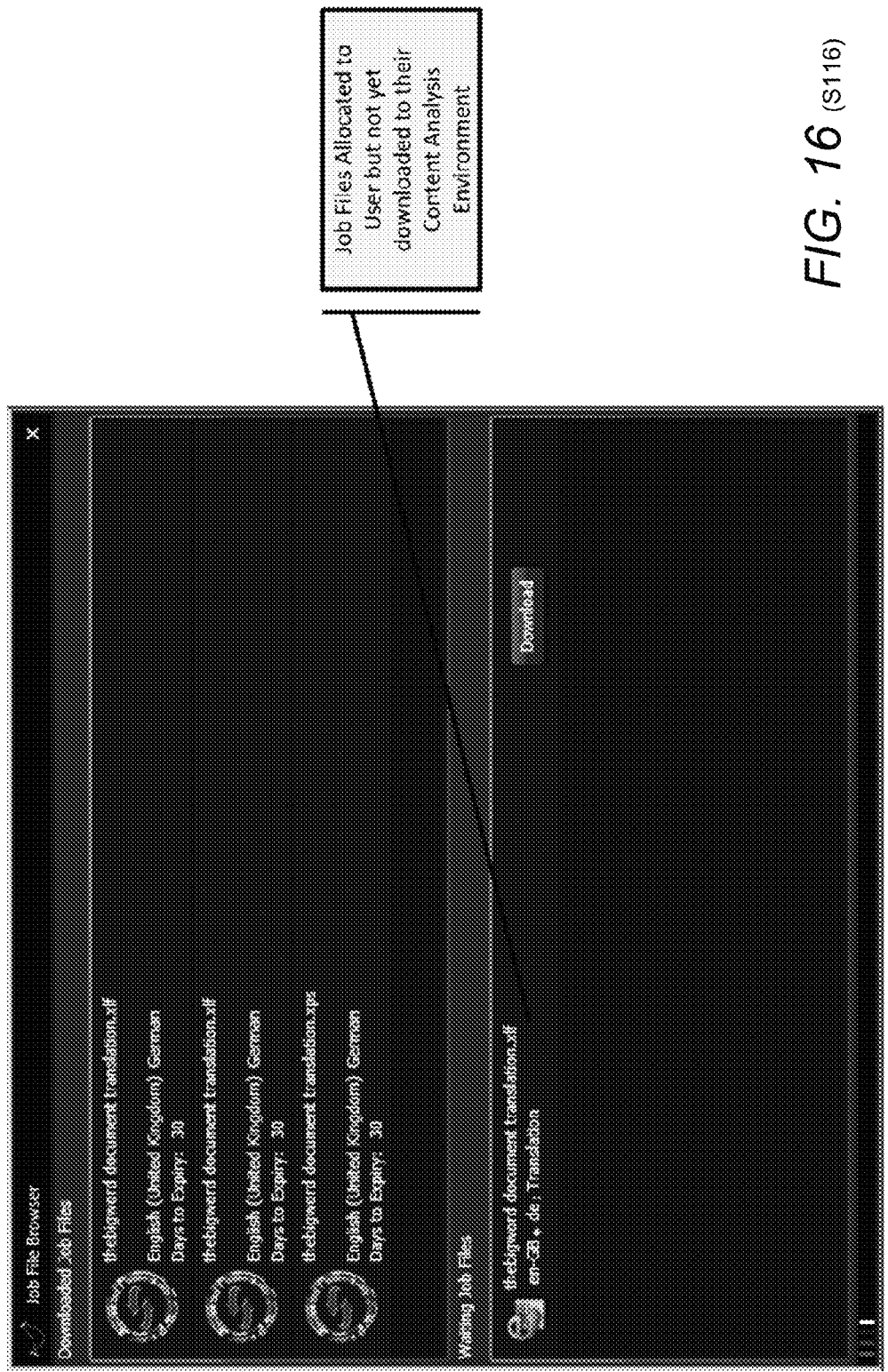
FIG. 16 (S116)

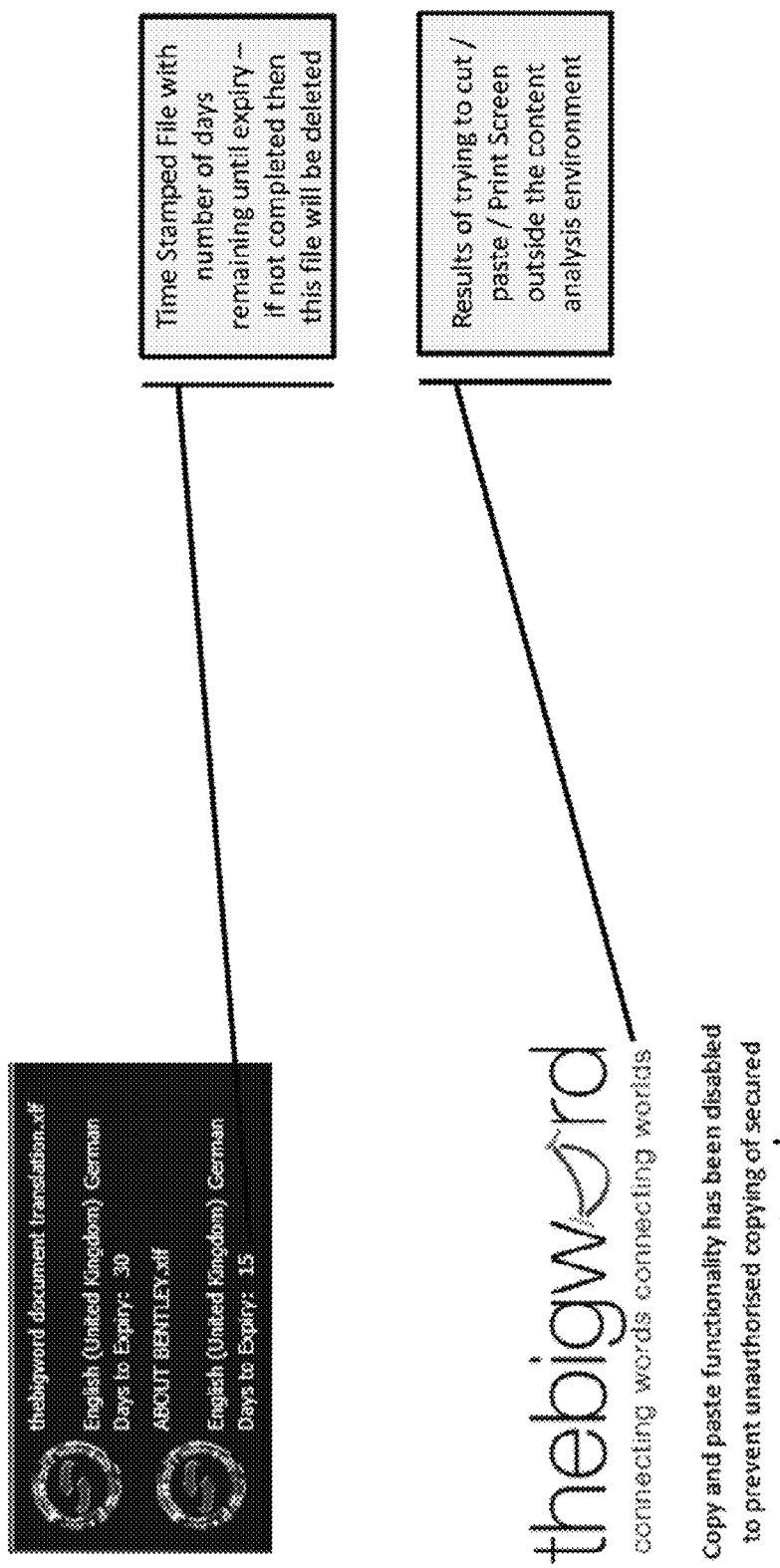
FIG. 17 (S117-S118)

APPARATUS AND METHOD FOR CONTENT HANDLING

CROSS-REFERENCE TO RELATED APPLICATION

This application claims priority from GB Application No. 1405025.6 filed on 20 Mar. 2014, the disclosure of which is incorporated herein by reference in its entirety.

BACKGROUND

Technical Field

Example embodiments of the present invention relate to an apparatus and method for content handling, for example to maintain confidentiality and increase content integrity.

Example embodiments of the present invention find use in an electronic content handling system when content, for example electronic documents, are to be transferred across a computer network for analysis by a user of a client terminal, and/or transferred from a client terminal to a content server.

Description of Related Art

In delivery of media content, for example music or audio-visual data, the problem of preventing unauthorised storage and/or reproduction of the electronic content is well known, and is referred to as digital rights management. In the context of content comprising electronic documents, where the information in the documents may be industrially or commercially sensitive and therefore access is to be controlled, the concept of information rights management has been developed. Typically this involves storing documents in an encrypted format to inhibit unauthorised access. In addition, documents, when decrypted may be handled within a framework which prevents reproduction by controlling copy and paste, or other reproduction according to set policies.

The implementation of strong information rights management policies within an organisation, for example the establishment of standards for encryption, access and permissions management according to known frameworks for authorised reproduction is relatively straightforward, in the sense that the organisation in question can build a complete set of policies and a framework for enforcement of the policies. However, problems may arise when the organisation wants to apply information rights management policies to documents which are to be accessed outside the framework over which it has full control.

In particular, problems may arise when a document is to be transferred to a client terminal outside an organisation, for analysis by a user of the client terminal. Although the user of the client terminal may be verified as a trusted individual, the features and security status of the client terminal may not be known in advance of the transfer. The security status of the client terminal may change while the document is being stored by the client terminal. If the client terminal is compromised then the information security of the document and its content is put at risk.

A typical situation where this problem arises is in the provision of an industrially or commercially sensitive document to an outside linguist in order for a translation to be prepared. The linguist can access a document using a client terminal, analyse the document, prepare the translation on the client terminal, but this ought to be possible only within information rights management policies determined according to the organisation that originates the document. The content server may belong to a trusted intermediary between the organisation that originates the sensitive document and the linguist. For example, the content server may belong to a translation service provider, with many linguists that work for the translation service provider able to download documents onto personal client terminals on which translations will be prepared. In this situation, compromise of the client terminals of the translators is difficult to determine, and therefore a need arises to improve content handling to maintain confidentiality and increase content integrity. Furthermore, content handling in this context ought not to get in the way of controlled access to the content nor impede the work or analysis which is done at the client terminal. Subsequent provision of content back to the content server ought also to be regulated, but in a way that does not impede the upload process.

The example embodiments have been provided with a view to addressing at least some of the difficulties that are encountered in current content handling systems, whether those difficulties have been specifically mentioned above or will otherwise be appreciated from the discussion herein.

SUMMARY OF THE INVENTION

According to example embodiments, there are provided: an apparatus and method for content handling; a computer system comprising a content server and a client terminal; a content server; a client terminal; and computer-readable storage media as set forth below. Other, optional, features will be apparent from the statements below, and the description which follows.

There now follows a summary of various aspects and advantages according to embodiments of the invention. This summary is provided as an introduction to assist those skilled in the art to more rapidly assimilate the detailed discussion herein and does not, and is not intended in any way to limit the scope of the invention.

At least some of the following example embodiments provide an apparatus for content handling, for example by providing elements in a computer system comprising a content server and a client terminal. Advantageously, example embodiments provide the client terminal with easy access to a secure environment in which content can be downloaded from the content server for analysis by a user of the client terminal. The secure environment at the client terminal facilitates downloading of content, imparts controls on what the user of the client terminal is permitted to do with the content, and facilitates the secure uploading of related content back to the content server. Many other advantages and improvements will be discussed in more detail below.

In one example embodiment an apparatus for content handling is provided. The apparatus may comprise a content server arranged to provide a content analysis environment to a client terminal, and to provide content to the client terminal for analysis within the content analysis environment once the content analysis environment has been established at the client terminal, wherein the client terminal is arranged:

to download the content from the content server into the content analysis environment;

to encrypt the downloaded content and store the encrypted content therein in a persistent form;

to decrypt the encrypted content into working memory therein for analysis within content analysis environment;

to encrypt analysed content and store the encrypted analysed content therein in a persistent form; and to decrypt the encrypted analysed content and to upload this decrypted content to the content server.

In one example embodiment a content server is provided. The content server is arranged to provide a content analysis environment to a client terminal, and to provide content to the client terminal for analysis within the content analysis environment once the content analysis environment has been established at the client terminal. The content server is suitably further arranged to receive content from the client terminal.

In one example embodiment a client terminal is provided. The client terminal is arranged to receive, from a content server, a content analysis environment, and to receive content for analysis within the content analysis environment once the content analysis environment has been established; wherein the client terminal is further arranged to:

download the content from the content server into the content analysis environment;

encrypt the downloaded content and store the encrypted content therein in a persistent form;

decrypt the encrypted content into working memory therein for analysis within content analysis environment;

encrypt analysed content and store the encrypted analysed content therein in a persistent form; and decrypt the encrypted analysed content and upload this decrypted content to the content server.

In one example embodiment method for content handling is provided. The method may comprise a content server providing a content analysis environment to a client terminal, and the content server providing content to the client terminal for analysis within the content analysis environment once the content analysis environment has been established at the client terminal. The method may further comprise the client terminal: downloading the content from the content server into the content analysis environment; encrypting the downloaded content and storing the encrypted content therein in a persistent form; decrypting the encrypted content into working memory therein for analysis within content analysis environment; encrypting analysed content and storing the encrypted analysed content therein in a persistent form; and decrypting the encrypted analysed content and uploading this decrypted content to the content server. The method may further comprise receiving the uploaded content at the content server.

In one example embodiment a method for content handling is provided. The method may comprise receiving, from a content server, a content analysis environment, and to receive content for analysis within the content analysis environment once the content analysis environment has been established; and further comprising:

downloading the content from the content server into the content analysis environment;

encrypting the downloaded content and store the encrypted content therein in a persistent form;

decrypting the encrypted content into working memory therein for analysis within content analysis environment;

encrypting analysed content and storing the encrypted analysed content therein in a persistent form; and decrypting the encrypted analysed content and uploading this decrypted content to the content server.

In one example embodiment a method for content handling is provided. The method comprises providing, from a content server, a content analysis environment to a client terminal, and providing content to the client terminal for analysis within the content analysis environment once the content analysis environment has been established at the content server, wherein method further comprises:

providing the content from the content server into the content analysis environment; and receiving content at the content server from the client terminal.

In one example embodiment, the client terminal can check for an existing installation of the content analysis environment. In one example embodiment the client terminal is arranged to access a software deployment utility over the Internet, for example by browsing to a hyperlink, with the software deployment utility thereby accessed via a web-based application. Suitably, the software deployment utility is arranged to determine the status of the client terminal with respect to one or more of:

I. whether the client terminal meets pre-requisite criteria for installation of the content analysis environment;

II. whether the content analysis environment is already installed on the client terminal; and III. whether any existing installation of the content analysis environment on the client terminal is the latest version.

In one example embodiment the content analysis environment is arranged, on launch, to request user credentials. Suitably, the user credentials comprise a unique username and a password, associated with a trusted user. Suitably, the credentials are validated via a secure web-service. Suitably the validation is performed at the content server, for example such that users can therefore only download content from the content server when online and connected to the content server.

Suitably, the method further comprises the client terminal downloading the content from the content server into the content analysis environment using a secure web-service, for example a secure web service employing a cryptographic protocol such as SSL, or TLS. Suitably the method of validation comprises transferring the user credentials using a secure web-service, for example a secure web service employing a cryptographic protocol such as SSL, or TLS.

Suitably, the user credentials are used by the content server to generate a user-specific encryption key on installation of the content analysis environment. Suitably, the user-specific encryption key is based on the user's credentials according to a predetermined rule, which is suitably a secret. Suitably, the content server is arranged to store generated user-specific encryption key there-within. Suitably, the generated user-specific encryption key is generated in a manner which is independent of the time of installation of the content analysis environment on the client terminal. Suitably, the generated user-specific encryption key is generated in a manner which is independent of the type client terminal on which the installation of the content analysis environment takes place. Suitably, the user-specific encryption key is stored on the client terminal, for example in a hidden directory. Suitably, the user-specific encryption key is stored in a hashed form, for example using a predetermined hashing algorithm.

In one example embodiment the downloaded content is encrypted using the user-specific encryption key, at the client terminal, and stored in encrypted form at the client terminal in a persistent form. Suitably the encrypted content is stored at the client terminal, for example in a hidden directory.

In one example embodiment the client terminal is arranged to decrypt the encrypted content into working memory therein, for analysis within content analysis environment. Suitably the encrypted content is decrypted using the user-specific encryption key.

In one example embodiment the content analysis environment is arranged to provide an analysis window, in which the decrypted content can be examined for analysis. Suitably, the content analysis environment is arranged to provide an analysed content window, in which analysed content may be received. In one example embodiment the content in the analysis window may comprise text in one language, and the analysed content window is used to receive a translation of the content into another language. Suitably the content analysis environment is arranged to provide the content analysis window and the analysed content window in a side-by-side arrangement, for example for display on the client terminal. Suitably, the analysis window comprises a graphic rendered, for example a rendered for text, or image files, for example for .XPS files or the like. Suitably, the analysed content window comprises a text editor, preferably a WYSIWYG editor.

In one example embodiment the content analysis window and/or the analysed content window may be coupled to the content server, such that computer-aided-translation functionality is provided via the content analysis environment, to aid the user in analysing the content.

In another example embodiment the content analysis environment comprises an analysis window including an audio playback module, and the analysed content window comprises a transcription template for receiving a transcription of audio content as the analysed content.

In one example embodiment, the content analysis environment is arranged to receive analysed content from the user, for example in an analysed content window, and to store, in persistent storage in the client terminal, the received analysed content in encrypted form. Suitably, the received analysed content is stored in response to a save command received from a user. Suitably, the content analysis environment is further arranged to decrypt the encrypted, stored received analysed content after saving, and to cause this decrypted content to be uploaded to the content server. Suitably, this upload takes place using a secure web-service, for example a secure web service employing a cryptographic protocol such as SSL, or TLS.

Suitably, after this upload, the content analysis environment is arranged to perform a secure deletion of the encrypted analysed content, and/or the encrypted downloaded content. In one example embodiment the secure deletion is performed using SDelete. In one example embodiment the secure deletion comprises providing padding data to the encrypted content prior to deletion.

In one example embodiment, the content analysis environment is arranged to query the content server after upload of content thereto, such that details of further content for analysis available from the content server is provided to the content analysis environment. Suitably, the content analysis environment is arranged to display details of the further content to a user.

In one example embodiment, the content analysis environment is arranged to provide a timestamp on content downloaded from the content server. Suitably, the content analysis environment is arranged to check the timestamp on downloaded content, and perform a secure deletion after predetermined period. Suitably, the content analysis environment is arranged to check timestamps on downloaded content when the content analysis environment is launched. Suitably, the content analysis is arranged to perform a periodic check of timestamps on downloaded content. Suitably, the predetermined period is by default 30 days. Suitably, the periodic check is performed daily.

In one example embodiment the content analysis environment is arranged such that if the destination of a potential paste operation becomes a location outside of the content analysis environment, data residing in a clipboard and sourced from within the content analysis environment is expunged from the clipboard. In one example embodiment the content analysis environment is arranged such that if the destination of a potential paste operation becomes a location outside of the content analysis environment, data residing in a screen-dump buffer is expunged there-from.

In another example embodiment there is provided a computer system comprising a content analysis environment, processing hardware including a working memory and persistent storage, and an operating system provided between the content analysis environment and the processing hardware. The computer system may for example comprise the client terminal or content server according to any example embodiment described herein, either alone or in combination with one another.

In one example embodiment, a computer-readable storage medium is provided having recorded thereon instructions which, when implemented by a computer system, for example a content server or a client terminal, either alone or in combination with one another, cause the computer system to be arranged as set forth herein and/or which cause the computer system to perform any of the methods as set forth herein. The computer-readable storage medium may for example comprise a tangible and/or non-transient medium.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements.

Various combinations of optional features have been described herein, and it will be appreciated that described features may be combined in any suitable combination. In particular, the features of any one example embodiment may be combined with features of any other embodiment, as appropriate, except where such combinations are mutually exclusive.

Throughout this specification, the term "comprising" or "comprises" means including the component(s) specified but not to the exclusion of the presence of others.

BRIEF DESCRIPTION OF THE DRAWINGS

For a better understanding of the invention, and to show how example embodiments may be carried into effect, reference will now be made to the accompanying drawings in which:

FIGS. 3-19 show example screen shots of a client terminal operating example embodiments of the content handling method;

FIGS. 15a and 15b show diagrams which provide an overview of how file storage space is allocated and demonstrates the necessity to pad files in order that a minimum file size is achieved for SDelete to operate correctly.

DETAILED DESCRIPTION OF EXAMPLE EMBODIMENTS

The example embodiments of the present invention will be discussed in detail in relation to computer systems useful in providing a translation or transcription of electronic content. However, the teachings, principles and techniques of the present invention are also applicable in other example embodiments.

The exemplary embodiments of the present invention will be discussed in detail in relation to a Microsoft™ Windows™ operating system. However, the teachings, principles and techniques of the present invention are also applicable in other exemplary embodiments. For example, the exemplary embodiments are also applicable to other operating systems.

Figure 1:
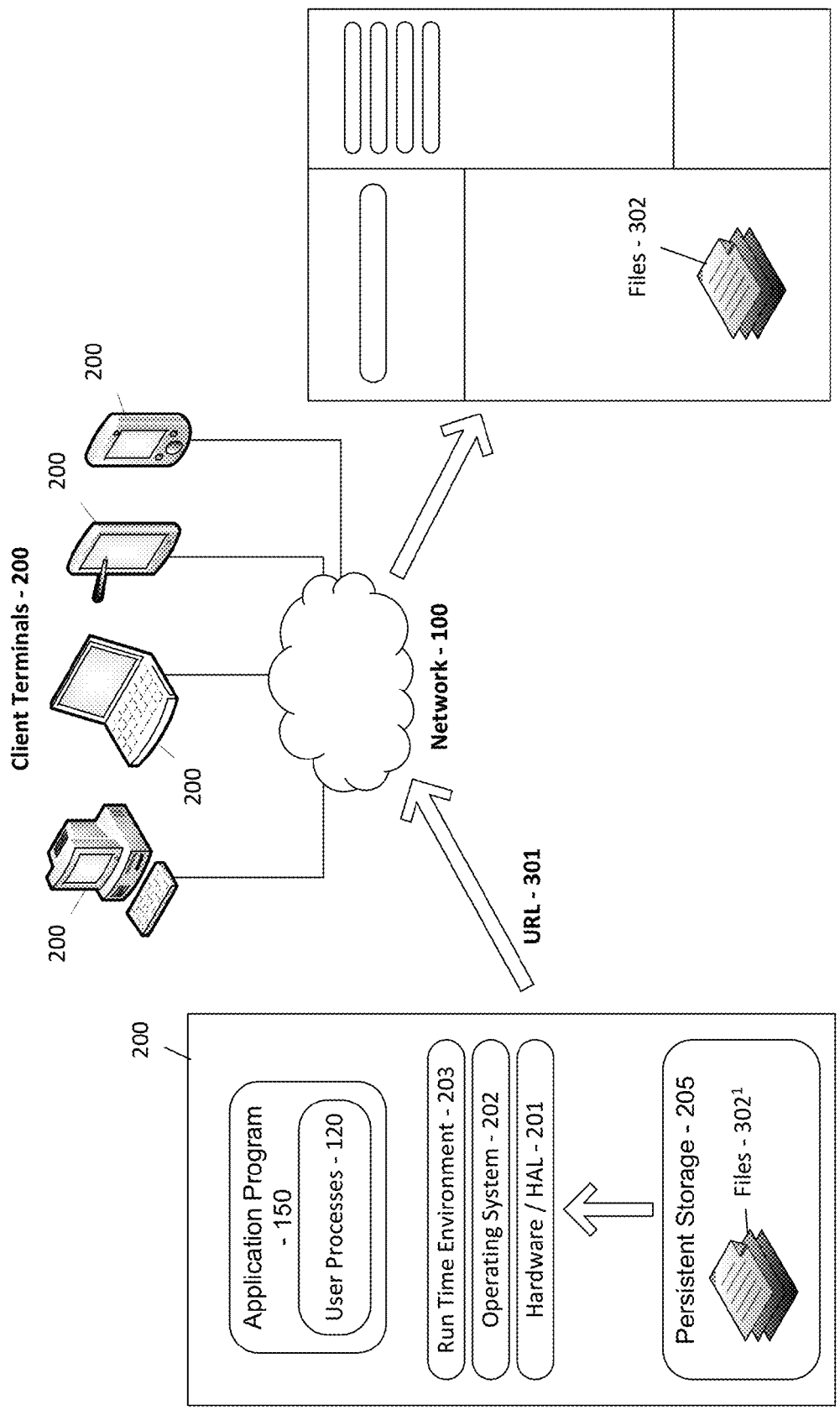
FIG. 1 shows a diagrammatic representation of a content server and client terminal, each according to an example embodiment, and connected to one another over a network.

FIG. 1 is a schematic overview of a client terminal 200 according to an exemplary embodiment of the present invention. In this example, the client terminal 200 includes physical hardware and hardware abstract layer (H/W) 201 such as persistent and working memory, processors, I/O interfaces, backbone, power supply and so on. An operating system (OS) 202 provides a multitude of components, modules and units that coordinate to provide a runtime environment (RTE) 203 which supports execution of a plurality of processes, including one or more user processes (USRP) 120. The processes 120 may relate to one or more application programs (APP) which the user desires to execute on the computer device 200. Here the application program (APP) comprises a content analysis environment 150.

As illustrated in FIG. 1, the client terminal 200 may take any suitable form. As one example, the client terminal 200 is a user-oriented computer device such as a desktop PC. As another example, the client terminal 200 is a portable user-oriented computer device such as a laptop computer, notebook, web-book, tablet, PDA or smartphone. As further examples, the client terminal 200 may have other form factors or be incorporated within another device, such as an entertainment device for video and/or audio processing or output (gaming device, set-top box, television, music player).

As shown in FIG. 1, the client terminal 200 employs a resource locator 301 which identifies the location of a content server 300 within a network 100 where one or more files 302 are located. For example, a network based on Internet protocols may use a uniform resource locator (URL) with syntax consistent with RFC3986. The client terminal 200 may then download the desired file or files 302 of content from the content server 300 and save these files in a persistent storage unit 205 which is accessible locally to the client terminal 200, such as a local hard drive or solid state storage (e.g. Flash RAM). As set out in more detail below, the content analysis environment 150 is provided at the client terminal to manage the content delivery and storage, and the subsequent transfer of content back from the client terminal 200 to the content server 300. Part of this process suitably involves the encryption of the files 302 into encrypted form $302^1$ before writing to the persistent storage unit 205.

Figure 2:
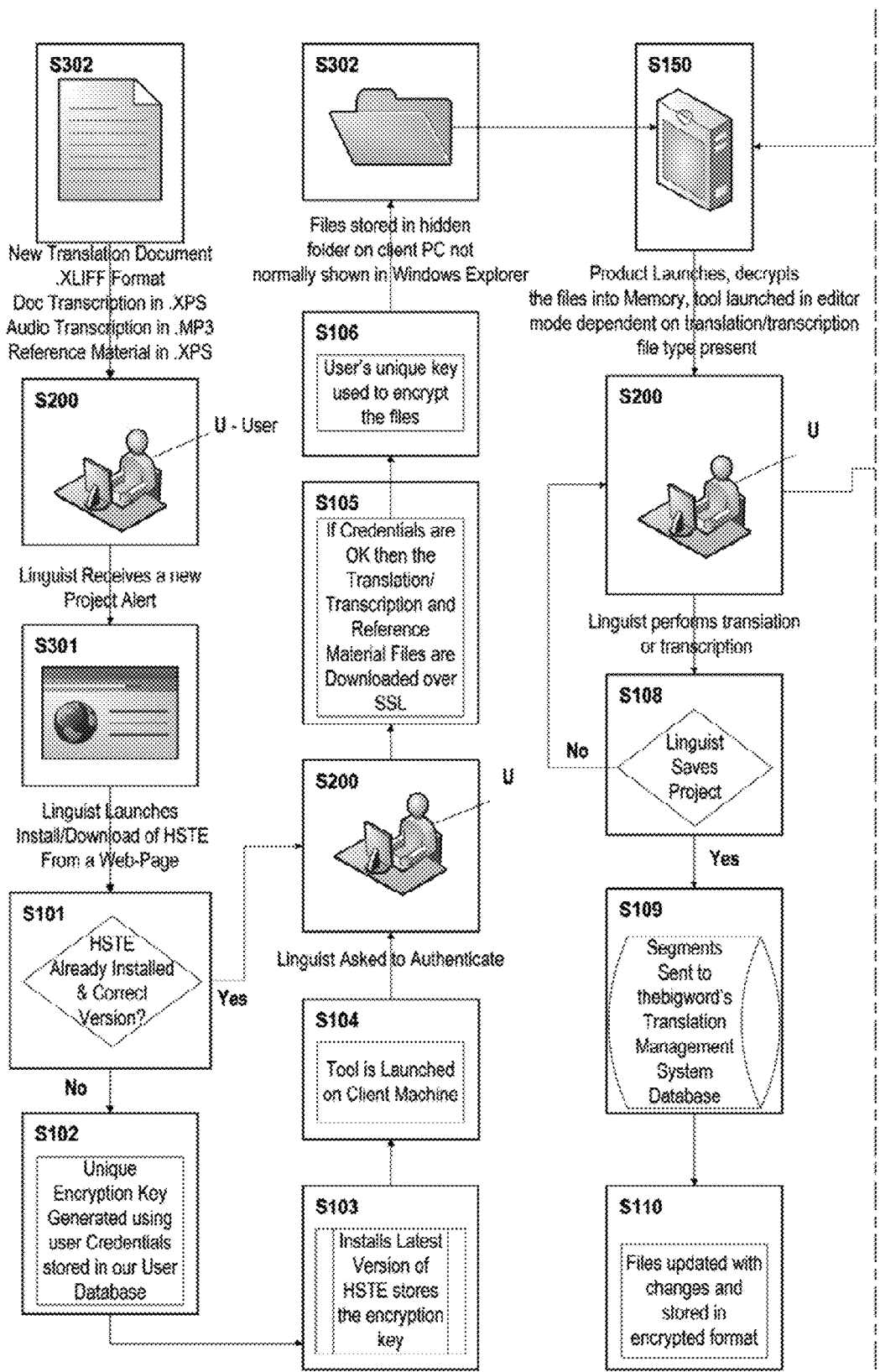
FIG. 2 is a diagrammatic representation of an apparatus for content handling, according to an example embodiment, and steps in a method of content handling according to an example embodiment.
Figure 2:
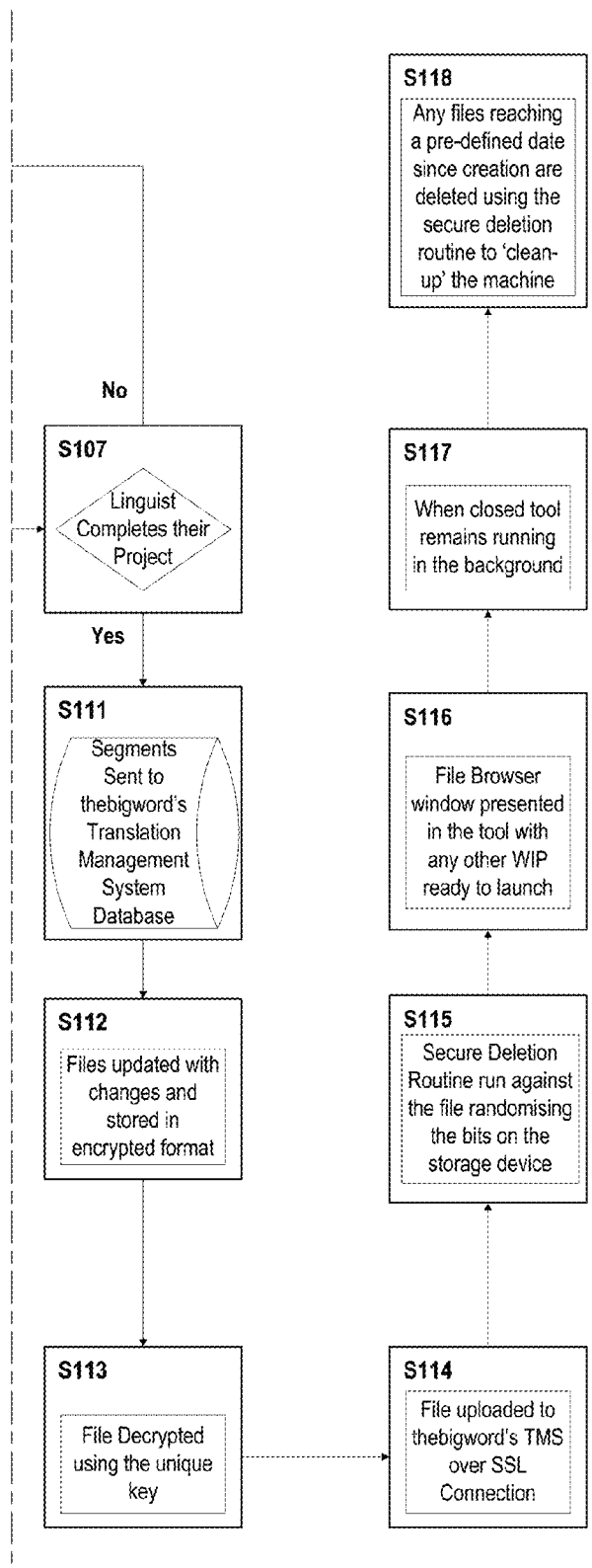
Figure 13:
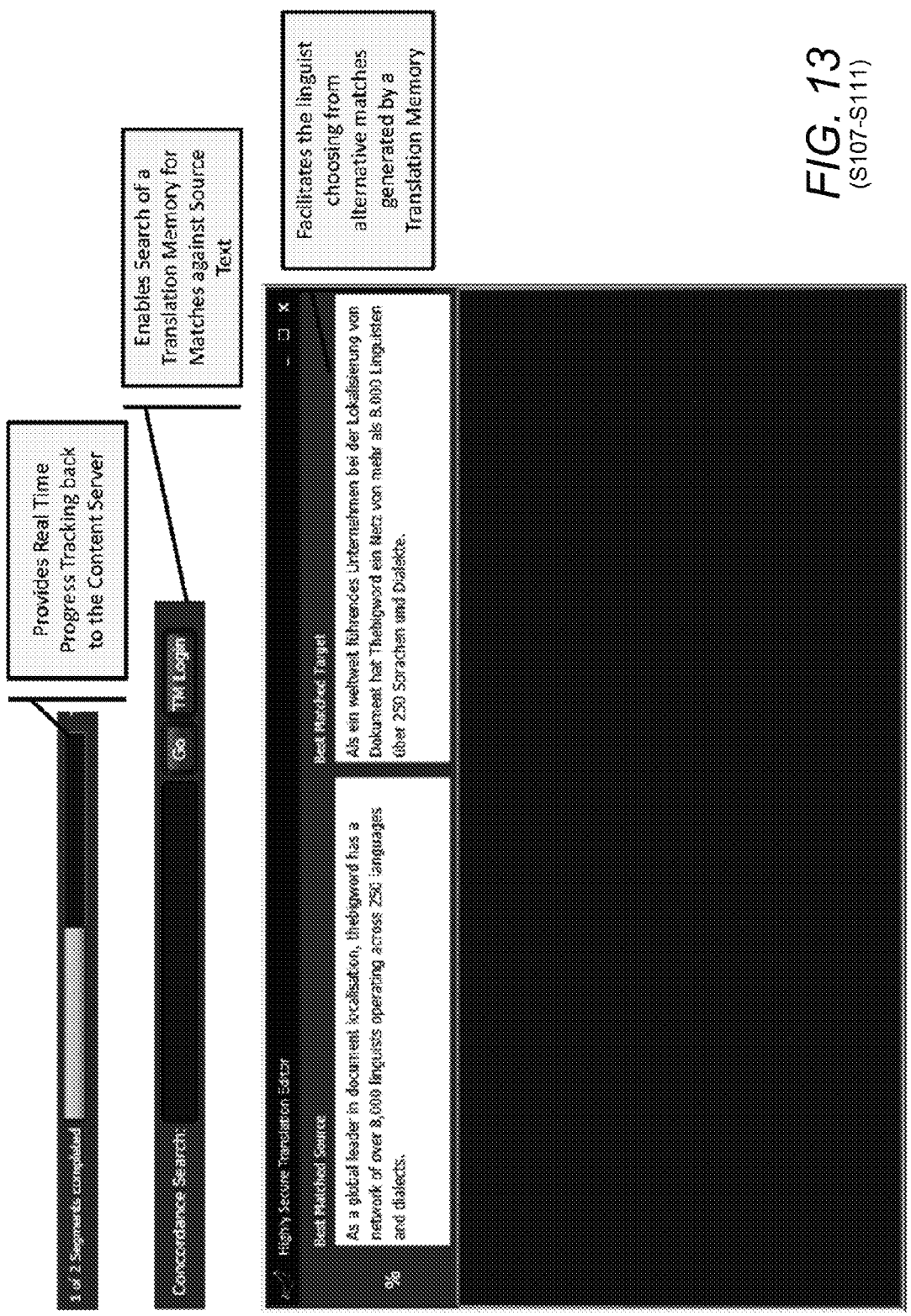

The operation of the client terminal 200 and the content server 300 will now be described in more detail with reference to the diagrammatic representation of FIG. 2. The example embodiments herein aim to provide a method and apparatus for content handling that is easy to use from the point of view of a user at a client terminal, but which is still effective, from the point of view of a content provider that operates a content delivery server, in restricting unauthorised transfer of the content outside of the context in which the content is provided to a user of the client terminal.

For example, the content server 300 may belong to a translation service provider, with a number of client terminals 200 operated by users U to perform translations using the linguistic skills of the users. The users U may have been pre-registered with the translation provider so that their relevant skills, identity etc. has been verified, and a username and password (or other suitable personal credentials) provided associated with each user U individually. Each user U may use their personal credentials when logging in to access content on the content server 300.

In a typically industrial or commercial environment the documents for translation may be confidential, and as such there needs a mechanism for secure content handling so that the content is not open to malicious or accidental publication. A first opportunity for publication may arise in transmission of the content between the content server 300 and the client terminal 200. In the example embodiment shown a standard SSL/TLS technique may be used to establish a client terminal 200 as within a circle of trust, and to encrypt the content against being read in transmission. However, once the content is received at the client terminal it may be desirable to impose information rights management policies on the user U, so that the content is handled securely. In this way, accidental distribution by the user U, or access to the content by malware on the client terminal 200 can be inhibited. These aims are addressed by use of the content analysis environment 150 to manage the download and handling of the content at the client side.

The content server 300 is provided with a content file 302 on which a user U is to perform an analysis, before uploading the results of the analysis back to the content server 300. The content file 302 in the present example is an XLIFF (XML Localisation Interchange File Format) document, and the required analysis is the preparation of a translation of the content of the document into the same format, but with the content reproduced in another language.

The user U is alerted to the presence of the content file 302, and the fact that analysis is required by a new project alert sent to the client terminal 200 by the content server 300. This new project alert is not subject to any information rights management policy, and the transmission of the new project alert and its notification to the user U may take place in accordance with standard messaging protocols.

In order for the user U to access the content the user U navigates to a URL 301 that points to the content analysis environment web page. Accessing this URL by the user U causes the client terminal 200 to check that the content analysis environment 150 is installed on the client terminal 200, for example using code installed and executed on the client terminal 200 in response to navigating to this URL, e.g. using Microsoft™ ClickOnce installer and configured as a trusted application using a Code Access Security protocol. This is shown as step S101. As well as checking for the presence/absence of the content analysis environment 150 at step S101, further checks are performed by the client terminal 200 to confirm whether the client terminal 200 meets the pre-requisites for installation of the content analysis environment, and if a pre-existing installation is present whether it is the most up to date version of the content analysis environment which is installed. If the client terminal 200 determines, based on a comparison of the version information of the content analysis environment 150 stored at the client terminal 200 and newest version information provided by the content server 300, that the content analysis environment 150 is the most up to date version, the method continues to step S104 and the content analysis environment 150 is launched on the client terminal 200. However, if there is no detected content analysis environment 150 on the client terminal 200 at step S101 the method continues to step S102.

In step S102 a user-specific encryption key is generated, based on the pre-established user credentials. Each user-specific encryption key is unique, and is generated in the content server 300 on a per-user basis, at the point of installation of the content analysis environment 150. Each user-specific encryption key is based on the user's personal credentials, which are known to the content server 300 and which are stored by the content server 300 as part of a single sign-on solution. A secret pre-determined algorithm may be used to derive each-user specific encryption key, or in other embodiments one from a range of algorithms may be used, but with data stored to enable later traceability in the user-specific encryption keys. In this way, when the content analysis environment 150 is re-installed, for example by the same user U on a different client terminal such as a machine bought to replace an out of date client terminal, user-specific encryption key which was previously generated will remain valid.

At step S103 the user-specific encryption key is stored on the client terminal 200, and the most up to date version of the content analysis environment 150 is installed on the client terminal 200. The user-specific encryption key is stored at the client terminal 200 in a hidden directory, and is suitably stored in a hashed form after being operated on according to a predetermined hashing algorithm.

After installation, the content analysis environment 150 is opened, at step S104. The next stage, before any content is handled by the content analysis environment 150 is for the user U to provide their personal credentials to log-in to the content analysis environment 150. The user's personal credentials are authenticated by the content server 300, and an SSL exchange is established between the content analysis environment 150 and the content server 300. This log-in and exchange is illustrated as step S105, after which the content file 302 is downloaded onto the client terminal 200.

At step S106 the user-specific key is used to encrypt the content file 302, and the encrypted content file 302 is written to the persistent storage 205 of the client terminal as encrypted content $302^1$. The encrypted content $302^1$ is in this embodiment stored in a hidden folder so as not to be immediately visible by exploring the Windows™ file system, or other file system supported by the operating system 202. In example embodiments the encrypted content $302^1$ may be stored in a mapped location, or other drive which the content analysis environment 150 determines to be accessible to the user U from the client terminal 200, according to a determination based on installed file systems of the client terminal 200 and/or according to a determination of file systems associated with an active user account provided by the operating system of the client terminal 200.

Once the content analysis environment 150 has stored the encrypted content $302^1$, it launches a translation or transcription editing tool, and loads a decrypted version of the encrypted content $302^1$ into the editing tool. The user U can at this point prepare the translation or transcription, working with the content file 302 exclusively within the content analysis environment 150 on the client terminal 200. As described in more detail below, the type of tool that is launched is determined by the content analysis environment, according to the file type downloaded onto the client terminal 302. For example, if the content file is in XLIFF format, the translation editing tool is launched. If the content file corresponds to a media file, e.g. in WAV, MPEG3 format or the like, an audio transcription editing tool is launched. If the content file is an image, for example in XPS format, a document transcription editing tool is launched.

In a typical Windows™ implementation, when the content analysis environment loads and runs as an executable application and is running it will be allocated RAM as a series of blocks. That is, the content analysis environment is configured not to make a request for a specific memory allocation in RAM on launch, so that the actual distribution of its data is not predetermined according to a predetermined rule. In this way, from the point of view of the operating system the allocation of blocks, for example in a cache or main memory, is not linked to logical constructs in the content analysis environment, or indeed to the decrypted version of the encrypted content $302^1$ that will be made available to the user U through the content analysis environment. This leads to enhanced security, as a core dump, analysis of the cache, or analysis of other portions of working RAM does not easily lead to any data that is recognisable as comprising the decrypted version of the encrypted content $302^1$.

At this point the user U has the decrypted version of the encrypted content $302^1$ available in the content analysis environment, and can either work through the content file 302 until the translation is finished according to the decision at step S107, or alternatively the user U may perform an intermediate save of the translation at step S108. In the event of an intermediate save, step S109 is performed, in which the SSL/TLS exchange between the client terminal 200 and the content server 300 is used to deliver completed segments of the translation back to the content server 300. Thereafter, at step S110 a local store of the completed segments is also performed by the content analysis environment 150, writing the content file 302 and the associated translation back to the persistent storage 205 as encrypted content $302^1$.

Intermediate saves are useful in providing additional functionality in the content handling system, because completed segments of translated content can then be used in the content server 300. In one example embodiment the completed segments may be made available to other users U that are set up to work on the same content file. For example, if a plurality of users U are each provided with the same content file to analyse, the first-completed segments may be shared between the users U to ensure consistency in the translation of later segments. Furthermore, completed segments may be fed into downstream processes in the content server, for example proof-reading, type-setting and provision of real-time information on progress of the work on the content file.

Because the user U must be able to access the content in order to prepare the translation, there is always the possibility of manual transcription, or screen photographs being taken. However, manual transcription, or reproduction using means outside of the computer system do not have the same potential for the most damaging breaches of information rights management policies, that is, breaches which may take place without knowledge of the user U and where digital data from within a computer system is reproduced directly. Another vulnerability through which data may be obtained from the computer system is using the clipboard buffer, or through services available in the operating system for moving information between processes. The clipboard service in the example embodiments described is provided by the Windows™ operating system 202, and therefore disabling its functionality is not straightforward. Functionality provided in the Windows™ operating system by services such as Dynamic Data Exchange and OLE2 (Object Linking and Embedding version 2) facilitate the cut, copy, paste and related clipboard functions between applications running in different windows.

Within the content analysis environment it will in many instances be desirable to provide copy/cut and paste functionality to the user U to facilitate their translation work. Specifically, this functionality can support use of reference materials that the user U may want to copy from. It is common practice to supply reference materials to support translation, for example materials which include terminology or glossary content, or other supporting materials which the user U can include within their translation. Facilitating copy/cut and paste within the content analysis environment can therefore enhance the productivity of the user U in preparing a translation.

The inventors have realised therefore that data which is copied to the clipboard buffer from within the content analysis environment is to be made available only within the content analysis environment for pasting. If the destination of a paste operation becomes another process, or window, i.e. any location outside of the content analysis environment, the content analysis environment is arranged rapidly to activate a service to clear the content of the clipboard. Similar considerations apply to the content of the screen-dump buffer. Print Screen and similar tools in the Windows™ utilise the clipboard for screen-dumps, and therefore the images taken can be clearing using analogous steps. In other environments in which example embodiments may be deployed, tools which use alternative methods for storing of screenshot images may be encountered, for example enabling similar methods of dumping the clipboard buffer to be employed in a web-based UI environment.

If at step S107 the user U indicates that the translation is finished, the step S111 is performed, in which the SSL/TLS exchange between the client terminal 200 and the content server 300 is used to deliver completed segments of the translation back to the content server 300. Thereafter, at step S112 a local store of the completed segments is also performed by the content analysis environment 150, writing the content file 302 and the associated translation back to the persistent storage 205 as encrypted content $302^1$. Following this step the encrypted content $302^1$ is decrypted and uploaded onto the content server 300 by SSL exchange between the client terminal 200 and the content server 300.

Following the abovementioned steps in the content handling process, the content analysis environment 150 is arranged to perform a clean-up process involving secure deletion, re-starting, background execution for the purpose of determining data expiry and expunging of expired data in steps S115-S118.

In more detail, step S115 involves the content analysis environment 150 performing a secure deletion of the data areas in the persistent and/or working memory of the client terminal 200 which have contained the content files 302/$302^1$. The secure deletion at step S115 may be at least in part performed using SDelete. SDelete is a command line utility provided in Windows™ operating systems. SDelete works by repeatedly overwriting the content of a file being deleted with a series of randomized bits, and only thereafter deleting the file using the normal delete functionality of the operating system.

The inventors have noted that in order for SDelete to function effectively, it ought to be applied to files covering a data area comprising a sufficiently large number of blocks of data. For example, if the file size is too small in relation to block length then the SDelete utility cannot overwrite the file, because SDelete is configured to work on files of a minimum size determined with reference to the number of blocks occupied by the file. The inventors have noted that in some cases the operating system 202 of the client terminal 200 produces compression or compartmentalisation of the data area in which the content files 302/$302^1$ are stored, and this can lead to file sizes below the minimum threshold for SDelete to function properly. To overcome this problem the content analysis environment 150 is configured to pad data areas which have contained the content files 302/$302^1$, if necessary, so that SDelete is applied to a sufficiently large number of blocks. The content analysis environment 150 is arranged to provide the padding at point of creation of the encrypted file, before the encrypted file is written to memory. In this way proper operation of SDelete can take place.

SDelete is operable to securely delete existing files, as well as to securely erase any file data that exists in the unallocated portions of a disk, including files that have already been deleted or encrypted. SDelete is designed to implement processes which meet the guidelines published by the National Institute of Standards and Technology (NIST) within its Special Publication 800-88.

The National Industrial Security Program, or NISP, is the nominal authority (in the United States) for managing the needs of private industry to access classified information. A major component of the NISP is the NISP Operating Manual, also called NISPOM, or DoD 5220.22-M references secure disk sanitization; however in practice the NIST SP 800-88 has superseded references made in DoD 5220.22M.

In implementing SDelete this means that data deleted in this way is not practically recoverable and meets the guidelines as published in NIST SP 800-88 and referenced in DoD 5220.22-M. More information on SDelete is available here: http://technet.microsoft.com/en-us/sysinternals/bb897443.aspx, although other strong deletion algorithms may be used in alternative embodiments, for example which may also suffer a minimum file size problem, and which therefore may also benefit from the practice of padding data areas as described herein.

Before the content analysis environment 150 is closed, it is configured at step S116 to provide the user U with information on any analysis tasks that have been started, but are not yet complete. This can be beneficial in minimising the number of initialisations of the content analysis environment 150, as in some cases the user U may elect to continue with the tasks that are currently work-in-progress rather than allowing the content analysis to close.

At step S117 the content analysis environment 150 is removed from the foreground of user applications running on the client terminal 200, but may remain active in the background, or active in the sense that it will re-initialise and run when the client terminal 200 re-boots. This enables the operation of step S118 to be performed, in which the passage of time leads to a decision that the data stored by the content analysis environment 150 should be considered expired, and therefore expunged from the client terminal 200. The expiry of data stored by the content analysis environment 150 is determined with reference to a timestamp created for the data, for example when the data is first downloaded onto the client terminal 200, or first stored in encrypted form. Once a predetermined amount of time has elapsed since the timestamp the content analysis environment 150 deletes the data, for example also using the SDelete command line utility.

FIGS. 3-17 show example screen shots of a client terminal operating the content handling method of any preceding claim, along with additional commentary and information on the related steps described above in relation to FIG. 2. FIGS. 15a and 15b show diagrams which provide an overview of how file storage space is allocated and demonstrates the necessity to pad files in order that a minimum file size is achieved for SDelete to operate correctly.

Figure 18:
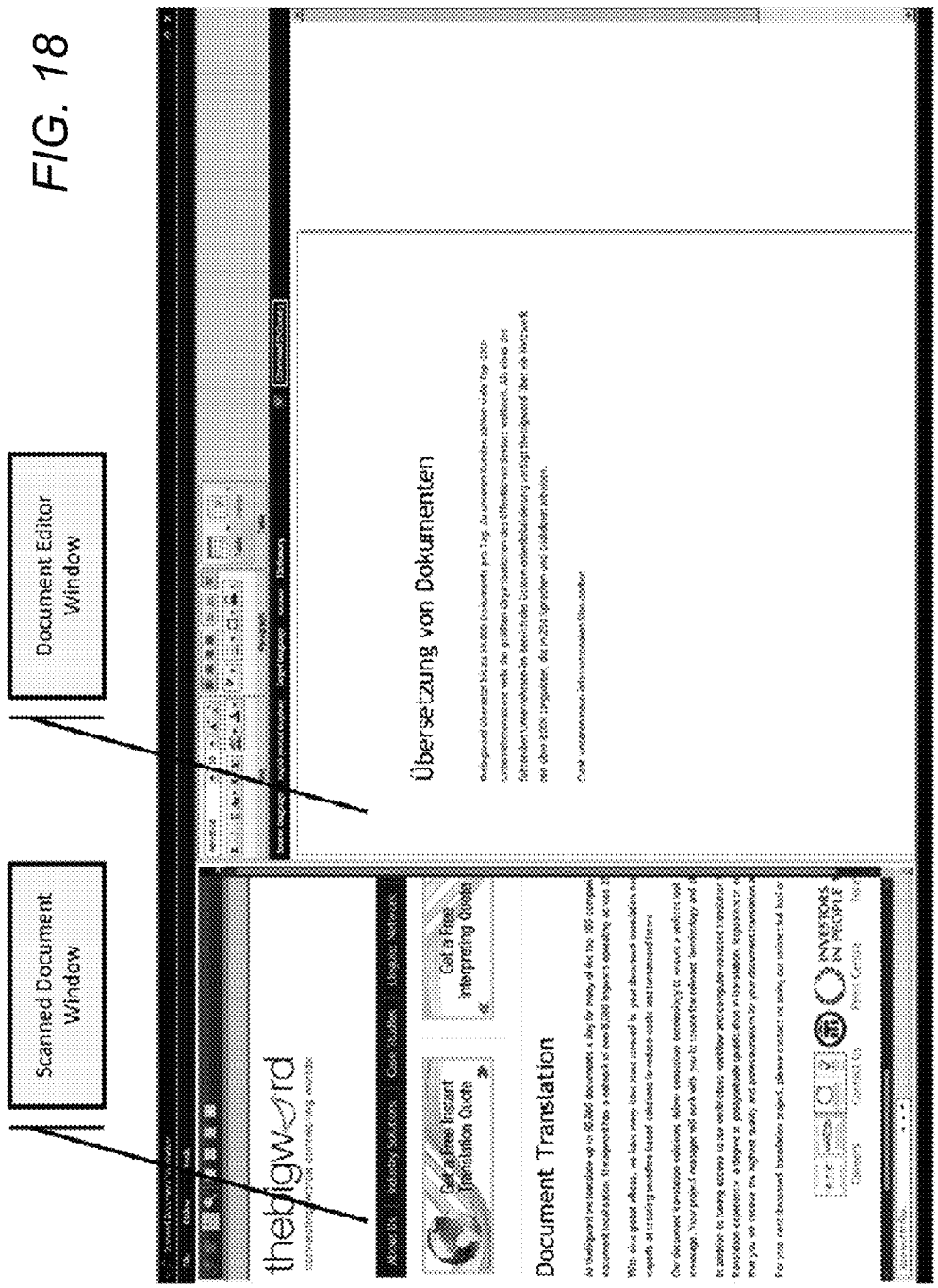
Figure 19:
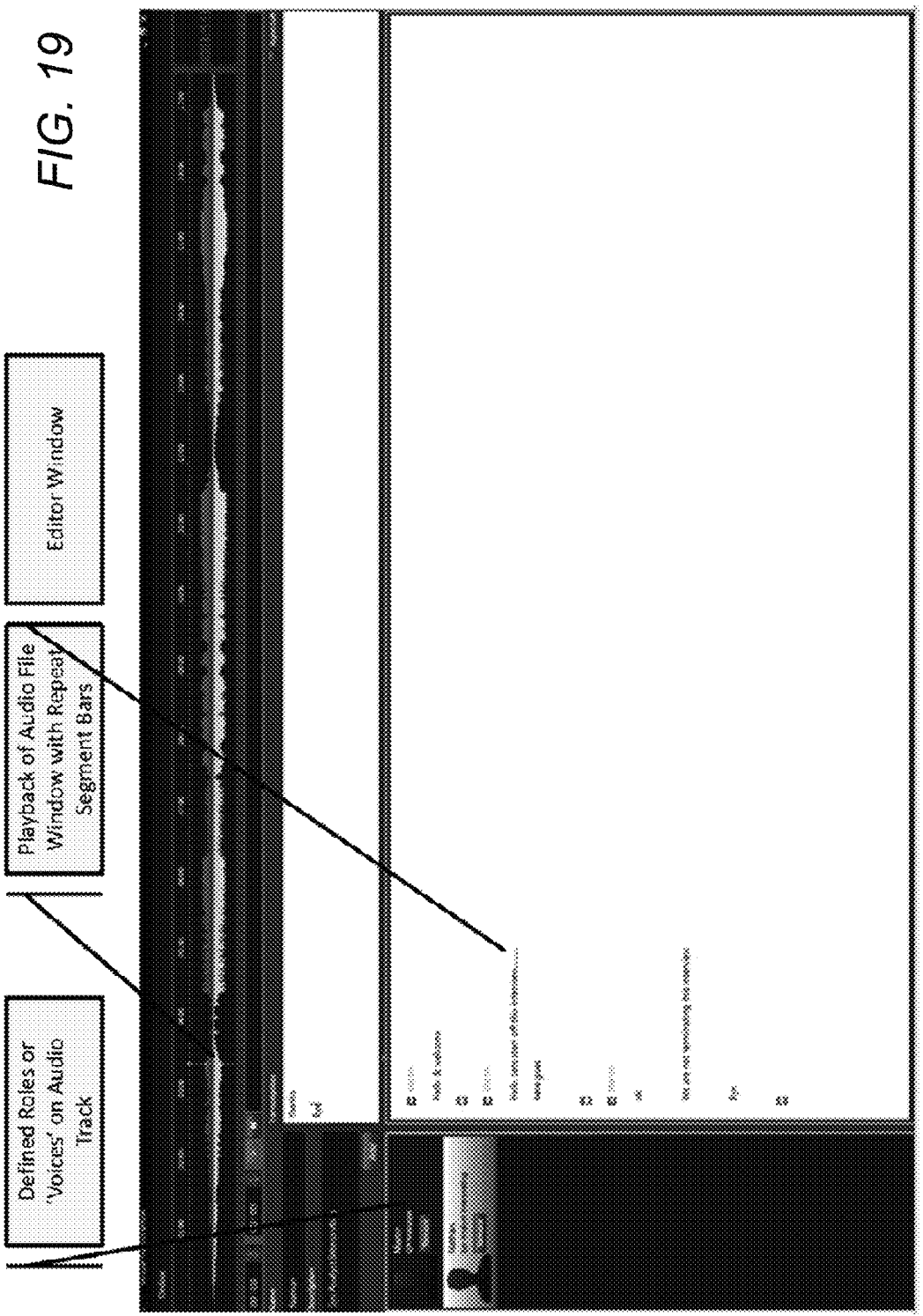

FIGS. 18 and 19 show example screen shots of a client terminal operating in which the analysis performed by the user U is translation from a document provided in .XPS format, and in which the analysis performed by the user is transcription of an audio file provided in .MP3 format. FIG. 19 illustrates the transcription of an audio file in which two people are speaking. Each speaker is assigned to a 'role' within the audio and playback transcription template. The content analysis environment is used to annotate the file and its transcription with metadata, used to indicate which segment of the audio file, and corresponding portion of the transcription matches an individual role played in the audio file by each speaker.

Figure 20:
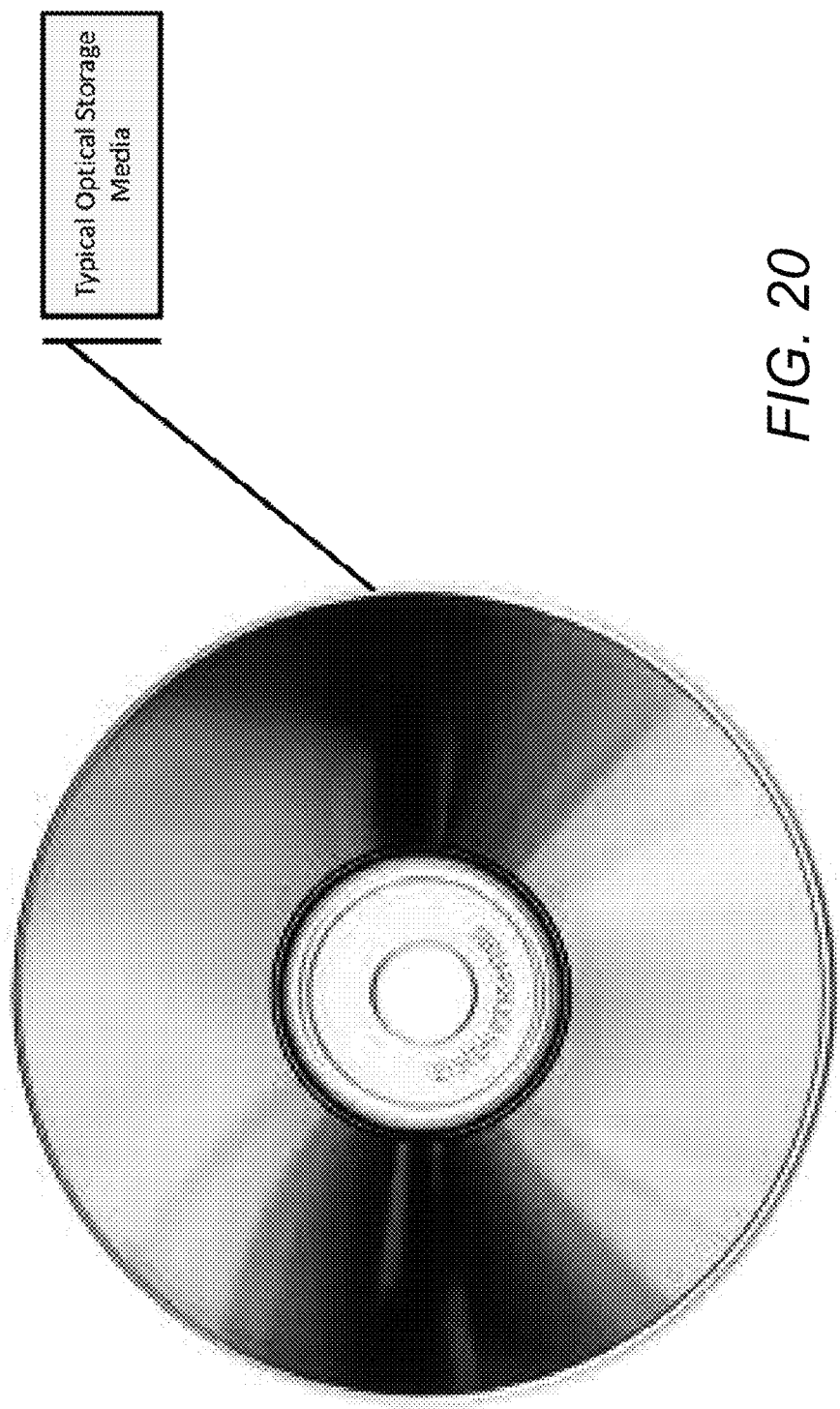
FIG. 20 shows a recording medium according to an example embodiment.

FIG. 20 shows an example of a computer-readable storage medium having recorded thereon instructions which, when implemented by a computer system, cause the computer system to be arranged as described herein, or which cause the computer system to perform any of the methods described herein. The computer-readable storage medium shown in FIG. 20 is an optical storage disc, but as will be understood various other media may be used in storing the relevant instructions, to be sold or licenced to parties interested in obtaining the benefit of the apparatus for content handling described herein, either from the point of view of the content delivery server side, or the client terminal side, or indeed from both.

In summary, the exemplary embodiments described an improved system for handling documents, which is helpful in maintaining a level of information rights management when using a computer system to distribute content for analysis such as translation or transcription. The industrial application of the exemplary embodiments will be clear from the discussion herein.

Although a few preferred embodiments have been shown and described, it will be appreciated by those skilled in the art that various changes and modifications might be made without departing from the scope of the invention, as defined herein, for example in any appended claims.

Attention is directed to all papers and documents which are filed concurrently with or previous to this specification in connection with this application and which are open to public inspection with this specification, and the contents of all such papers and documents are incorporated herein by reference.

The invention claimed is:

1. A client terminal arranged to:
   receive, from a content server, a content analysis environment, and to receive content for analysis within the content analysis environment once the content analysis environment has been established, the content server being operated by a content provider for controlling access to the content;
   download the content from the content server into the content analysis environment;
   encrypt the downloaded content and store the encrypted content therein in a persistent form;
   decrypt the encrypted content into working memory therein for analysis within an analysis window of the content analysis environment;
   analyse the decrypted content within the analysis window of the content analysis environment, wherein the analysis comprises editing the decrypted content;
   encrypt the analysed content and store the encrypted analysed content therein in a persistent form; and
   decrypt the encrypted analysed content and upload the decrypted analysed content to the content server, the decrypted analysed content being accessible by the content server,
   wherein:
      the content in the analysis window comprise text in a first language, and the analysed content window is used to receive a translation of the content into a second language;
      the analysis window comprises an audio playback module, and the analysed content window comprises a transcription template interface for receiving a transcription of audio content as the analysed content; and
      the content analysis environment is arranged such that when a destination of a potential paste operation becomes a location outside of the content analysis environment, data residing in a screen-dump buffer is expunged there-from.

2. A client terminal according to claim 1, wherein the content analysis environment is arranged, on launch, to request user credentials and wherein the user credentials are validated via a secure web-service at the content server.

3. A client terminal according to claim 2, wherein the user credentials are used by the content server to generate a user-specific encryption key on installation of the content analysis environment.

4. A client terminal according to claim 3, wherein the downloaded content is encrypted using the user-specific encryption key, at the client terminal, and stored in encrypted form at the client terminal in a persistent form.

5. A client terminal according to claim 4, wherein the client terminal is arranged to decrypt the encrypted content into working memory therein, for analysis within the content analysis environment, using the user-specific encryption key.

6. A client terminal according to claim 5, wherein the content analysis environment is arranged to provide an analysis window, in which the decrypted content can be examined for analysis.

7. A client terminal according to claim 6, wherein the content analysis environment is arranged to provide an analysed content window, in which analysed content is received.

8. A client terminal according to claim 6, wherein the content analysis environment is arranged to receive analysed content from the user in an analysed content window, and to store, in persistent storage in the client terminal, the received analysed content in encrypted form.

9. A client terminal according to claim 8, wherein the content analysis environment is arranged to decrypt the encrypted, stored received analysed content after saving, and to cause this decrypted content to be uploaded to the content server using a secure web-service employing a cryptographic protocol selected from a group comprising: SSL, TLS.

10. A client terminal according to claim 9, wherein after the upload, the content analysis environment is arranged to perform a secure deletion of one of a group comprising: the encrypted analysed content, the encrypted downloaded content.

11. A client terminal according to claim 1, wherein one of the content analysis window, the analysed content window is couple to the content server, such that computer-aided-translation functionality is provided via the content analysis environment, to aid a user in analysing the content.

12. A client terminal according to claim 1, wherein the content analysis environment is arranged such that when a destination of a potential paste operation is a location outside of the content analysis environment, data residing in a clipboard and sourced from within the content analysis environment is expunged from the clipboard.

13. A method for content handling, the method implemented by a client terminal, the method comprising:
 receiving, from a content server, a content analysis environment, the content server being operated by a content provider for controlling access to the content;
 receiving content for analysis within the content analysis environment once the content analysis environment has been established;
 downloading the content from the content server into the content analysis environment;
 encrypting the downloaded content and storing the encrypted content therein in a persistent form;
 decrypting the encrypted content into working memory therein for analysis within an analysis window of the content analysis environment;
 analysing the decrypted content within the analysis window of the content analysis environment, wherein the analysis comprises editing the decrypted content;
 encrypting the analysed content and storing the encrypted analysed content therein in a persistent form; and
 decrypting the encrypted analysed content and uploading the decrypted analysed content to the content server, the decrypted analysed content being accessible by the content server,
 wherein:
  the content in the analysis window comprise text in a first language, and the analysed content window is used to receive a translation of the content into a second language;
  the analysis window comprises an audio playback module, and the analysed content window comprises a transcription template interface for receiving a transcription of audio content as the analysed content; and
  the content analysis environment is arranged such that when a destination of a potential paste operation becomes a location outside of the content analysis environment, data residing in a screen-dump buffer is expunged there-from.

14. A method for content handling according to claim 13, the method further comprising:
 requesting user credentials on launching the content analysis window; and
 validating the user credentials via a secure web-service.

15. A method for content handling according to claim 14, the method further comprising:
 downloading the content, by the client terminal, from the content server into the content analysis environment using a secure web-service wherein the secure web service employs a cryptographic protocol selected from a group comprising: SSL, TLS.

16. A non-transitory computer-readable storage medium having recorded thereon instructions which, when implemented by a computer system, cause the computer system to:
 receive, from a content server, a content analysis environment, the content server being operated by a content provider for controlling access to the content;
 receive content for analysis within the content analysis environment once the content analysis environment has been established;
 download the content from the content server into the content analysis environment;
 encrypt the downloaded content and storing the encrypted content therein in a persistent form;
 decrypt the encrypted content into working memory therein for analysis within an analysis window of the content analysis environment;
 analyse the decrypted content within the analysis window of the content analysis environment, wherein the analysis comprises editing the decrypted content;
 encrypt the analysed content and store the encrypted analysed content therein in a persistent form; and
 decrypt the encrypted analysed content and upload the decrypted analysed content to the content server, the decrypted analysed content being accessible by the content server,
 wherein:
  the content in the analysis window comprise text in a first language, and the analysed content window is used to receive a translation of the content into a second language;
  the analysis window comprises an audio playback module, and the analysed content window comprises a transcription template interface for receiving a transcription of audio content as the analysed content; and
  the content analysis environment is arranged such that when a destination of a potential paste operation becomes a location outside of the content analysis environment, data residing in a screen-dump buffer is expunged there-from.

17. An apparatus for content handling, the apparatus for content handling comprising a content server arranged to provide a content analysis environment to a client terminal, and to provide content to the client terminal for analysis within the content analysis environment once the content analysis environment has been established at the client terminal, the content server being operated by a content provider for controlling access to the content, wherein the client terminal is arranged:

to download the content from the content server into the content analysis environment;

to encrypt the downloaded content and store the encrypted content therein in a persistent form;

to decrypt the encrypted content into working memory therein for analysis within an analysis window of the content analysis environment;

to analyse the decrypted content within the analysis window of the content analysis environment, wherein the analysis comprises editing the decrypted content;

to encrypt the analysed content and store the encrypted analysed content therein in a persistent form; and to decrypt the encrypted analysed content and to upload this decrypted content to the content server, the decrypted analysed content being accessible by the content server, wherein:

the content in the analysis window comprise text in a first language, and the analysed content window is used to receive a translation of the content into a second language;

the analysis window comprises an audio playback module, and the analysed content window comprises a transcription template interface for receiving a transcription of audio content as the analysed content; and the content analysis environment is arranged such that when a destination of a potential paste operation becomes a location outside of the content analysis environment, data residing in a screen-dump buffer is expunged there-from.

* * * * *